(12) United States Patent
Sato et al.

(10) Patent No.: US 7,552,092 B2
(45) Date of Patent: Jun. 23, 2009

(54) PROGRAM DISTRIBUTION METHOD AND SYSTEM

(75) Inventors: Yuji Sato, Tokyo (JP); Tomoaki Itoh, Kawasaki (JP); Takao Yamaguchi, Kokubunji (JP)

(73) Assignee: Panasonic Corporation, Osaka (JP)

( * ) Notice: Subject to any disclaimer, the term of this patent is extended or adjusted under 35 U.S.C. 154(b) by 969 days.

(21) Appl. No.: 10/919,338

(22) Filed: Aug. 17, 2004

(65) Prior Publication Data

US 2005/0049970 A1    Mar. 3, 2005

(30) Foreign Application Priority Data

Aug. 28, 2003  (JP)  ............................. 2003-305397
Jul. 6, 2004   (JP)  ............................. 2004-199677

(51) Int. Cl.
G06Q 99/00    (2006.01)

(52) U.S. Cl. .......................................... 705/54; 705/58

(58) Field of Classification Search .............. 705/50–79
See application file for complete search history.

(56) References Cited

U.S. PATENT DOCUMENTS

| | | | | |
|---|---|---|---|---|
| 4,288,659 | A * | 9/1981 | Atalla | .......................... 380/281 |
| 6,700,989 | B1 | 3/2004 | Itoh et al. | |
| 6,754,822 | B1 * | 6/2004 | Zhao | .......................... 713/176 |
| 7,293,294 | B2 | 11/2007 | Ukai et al. | |
| 2002/0126872 | A1 * | 9/2002 | Brunk et al. | .................. 382/100 |
| 2003/0163684 | A1 * | 8/2003 | Fransdonk | .................. 713/153 |
| 2003/0185417 | A1 * | 10/2003 | Alattar et al. | ................ 382/100 |
| 2004/0054892 | A1 | 3/2004 | Ji et al. | |
| 2004/0088549 | A1 | 5/2004 | Ukai et al. | |
| 2004/0102987 | A1 | 5/2004 | Takahashi et al. | |
| 2005/0074022 | A1 * | 4/2005 | Kato et al. | .................. 370/432 |
| 2006/0005021 | A1 * | 1/2006 | Torrubia-Saez | ............. 713/167 |

FOREIGN PATENT DOCUMENTS

| | | |
|---|---|---|
| EP | 0864959 A2 | 9/1998 |
| JP | 10-254909 A | 9/1998 |
| JP | 11-136618 A | 5/1999 |
| JP | 2000-076064 A | 3/2000 |
| JP | 2000-324096 | 11/2000 |
| JP | 2000-330873 | 11/2000 |
| JP | 2004-157703 A | 6/2004 |

OTHER PUBLICATIONS

Monden et al., 2000, IEEE, pp. 1-7.*
Monden et al., "A Digital Watermarking Method for Java Class Files," Journal of Information Processing Society of Japan, Information Processing Society of Japan, Nov. 16, 2000, vol. 41, No. 11, pp. 3001-3009, and an English language partial translation thereof.

(Continued)

*Primary Examiner*—Andrew J Fischer
*Assistant Examiner*—Jacob C Coppola
(74) *Attorney, Agent, or Firm*—Greenblum & Bernstein, P.L.C.

(57) ABSTRACT

In the present invention, a program is provided with a dummy module into which a watermark can be inserted without any effect on the operation of the program, and an digital signature. It is thereby possible for a distributor to insert a watermark for specifying a user to the dummy module, and to prevent unauthorized leakage of the program by the distributor. Further, by providing the program body with an digital signature, it is possible to prevent tampering of the program by the distributor.

2 Claims, 21 Drawing Sheets

OTHER PUBLICATIONS

English language Abstract of JP 11-136618 A.
English language Abstract of JP 10-254909 A.
English language Abstract of JP 2004-157703 A.
English language Abstract of JP 2000-076064 A.
English Language Abstract of JP 2000-324096.
English Language Abstract of JP 2000-330873.

* cited by examiner

PROGRAM DISTRIBUTION METHOD AND SYSTEM

BACKGROUND OF THE INVENTION

1. Field of the Invention

The present invention relates to a secure program distribution system to which program electronic watermarking is applied.

2. Description of Related Art

With progress of computer techniques, it has become general to distribute the program code (hereinafter abbreviated as a program) via networks. Corresponding to such distribution, there arise problems that a downloaded program is analyzed so as to leak algorithms and ideas used in the program, and that a program itself is tampered and used to commit fraud.

Further, program theft has become a significant problem such that a whole or part of a program developed by some person is used without proper authorization or re-distributed without permission of the developer of the program.

In consideration of future enlarged distribution of programs via networks, schemes are necessary to protect programs against fraud.

For example, a case is considered that a user operates a terminal to download a program from a distributor. In this case, a creator first creates a program. Next, a terminal of the distributor registers the program. Then, when a terminal of a user requests the terminal of the distributor to distribute the program, the terminal of the distributor transmits the program to the terminal of the user, and the terminal of the user downloads the distributed program to store.

In these circumstances, following threats are assumed:
1. The user leaks and/or tampers with the program.
2. The distributor leaks and/or tampers with the program.
3. Another creator steals the program.

As a distribution system against the threats, there are systems using encryption, tamper resistant hardware and/or electronic watermarking.

Herein, the tamper resistant hardware means hardware provided with mechanisms for preventing unauthorized internal analysis, for example, such that LSI automatically detects analysis of a program when the program included in LSI starts being analyzed, and deletes the program.

As a system using encryption, for example, there is a system disclosed in JP 2000-324096.

In this method, a terminal of a user first generates a secret key in a public key cryptography using an ID (terminal ID) specific to the terminal, and then, transmits the terminal ID to a distributor when downloading the content. The distributor generates a public key using the ID, encrypts the content, and transmits the encrypted content to the user. The user decodes the content using a secret key that is generated in advance on the user side to use.

Further, the encrypted content is decoded and used in a tamper resistant hardware area in the terminal of the user.

By this means, the downloaded content is prevented from undergoing unauthorized leakage and tampering.

Another system against the threats as described above is disclosed in JP 2000-330873.

In the method, a creator inserts a unique ID to specify a user of content into the created content, as an electronic watermark. Further, the creator encrypts the content in distributing the content to the user.

When the content undergoes unauthorized use, an unauthorized use monitoring center to monitor the use of the content searches networks, and compares an ID extracted from the content undergoing unauthorized use with a use condition (ID) stored in the center to specify a user who commits unauthorized use of the content.

The unauthorized leakage and tampering of content is thus prevented.

However, when a program is distributed in conventional content distribution systems, there is a problem that it is not possible to prevent unauthorized leakage and tampering of the program by a distributor.

In the case that a program created by a creator is registered with a terminal of a distributor, and that a user operates a terminal to download the program registered with the terminal of the distributor, it is very effective to insert a unique ID to specify the user into the program as an electronic watermark, so as to prevent unauthorized leakage by a user. Further, it is also effective to use tamper-resistant hardware to prevent tampering by a user.

However, in the conventional methods, a program does not include information to specify a distributor. Therefore, if a distributor commits unauthorized leakage, it is not possible to specify the distributor that is a leak source. Accordingly, there are no effects to suppress unauthorized leakage by distributors.

Further, when inserting an ID to specify a user into a program, a distributor inserts the ID of the user into the program. In this case, the distributor needs to handle the program in plain text.

Therefore, the distributor is capable of not only inserting an ID of a user but also tampering with the program so that the program operates in a different way. In other words, there is a risk that the program is tampered in the distributor.

It is also considered that a creator inserts an ID of a user into a program, instead of using a distributor. However, there are a large number of cases that the creator cannot serve as a distributor.

SUMMARY OF THE INVENTION

It is an object of the present invention to provide a scheme for enabling a distributor to insert information to specify a user into a program, while preventing unauthorized leakage and tampering of the program by the distributor.

The present invention provides a program body with a dummy module into which a watermark can be inserted without affecting the operation of the program body and with a digital signature.

The distributor is thereby capable of inserting a watermark to specify a user into the dummy module. Further, by providing the program body with a digital signature, it is possible to prevent the distributor from committing unauthorized leakage and/or tampering of the program.

DETAILED DESCRIPTION OF THE PREFERRED EMBODIMENTS

Embodiment 1

Figure 1:
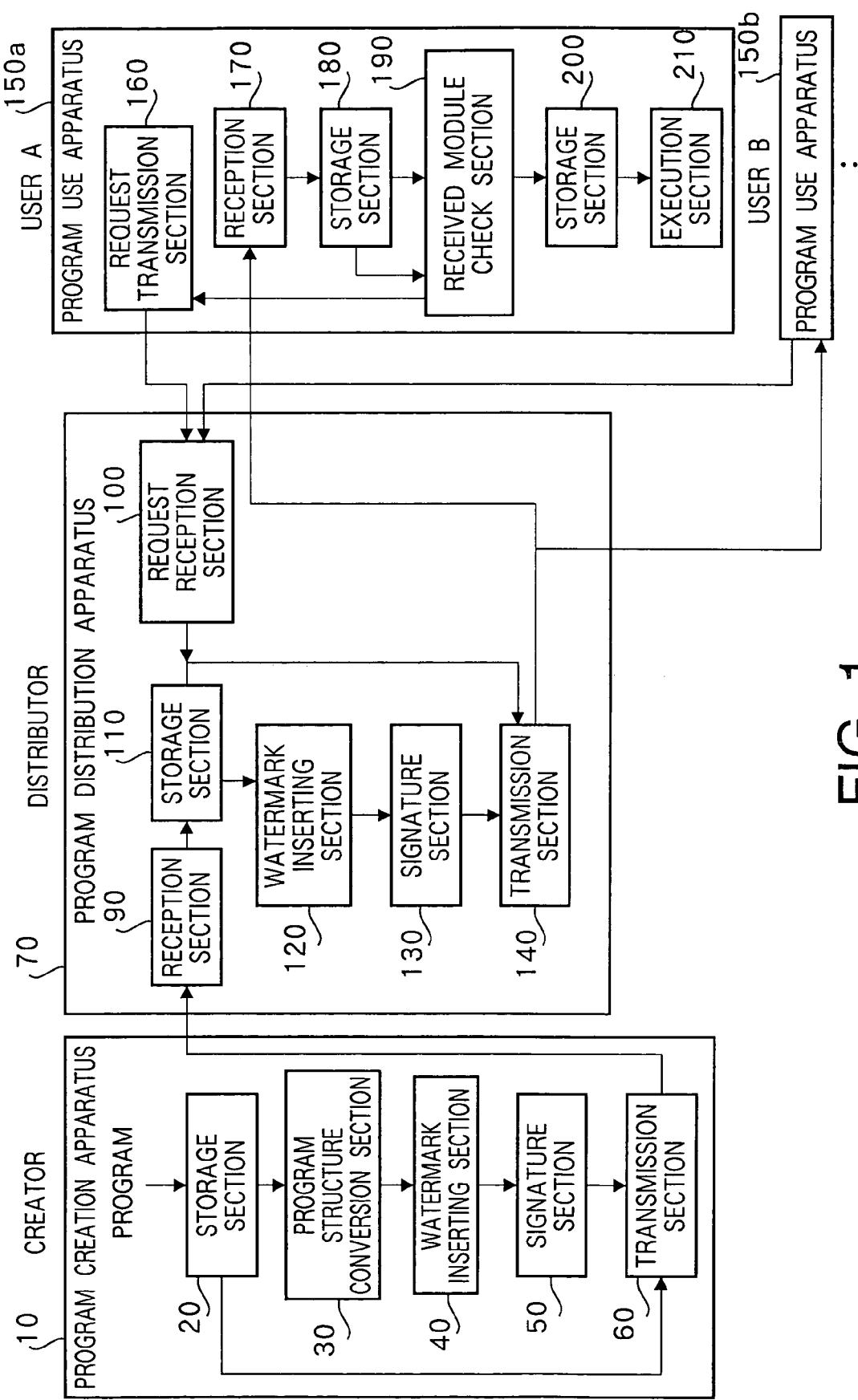
FIG. 1 is a configuration diagram of a program distribution system according to Embodiment 1 of the present invention.

A program distribution system according to Embodiment 1 of the present invention will be described below with reference to accompanying drawings. FIG. 1 is a configuration diagram of a program distribution system according to Embodiment 1.

The program distribution system according to Embodiment 1 is provided with program creation apparatus 10.

Program creation apparatus 10 represents a terminal of a creator such as a maker or person that creates programs.

Program creation apparatus 10 is provided with storage section 20. Storage section 20 is means for storing programs created by the creator and represents a physical device such as an FD, HD and internal memory.

Program creation apparatus 10 is further provided with program structure conversion section 30. Program structure conversion section 30 divides a program stored in storage section 20 into a plurality of modules (main-body modules). Further, program structure conversion section 30 adds a dummy module that does not have effects on the operation of the program to the divided program. Then, program structure conversion section 30 outputs the program converted as described above to watermark inserting section 40. In addition, program structure conversion section 30 will be described specifically later.

Watermark inserting section 40 inserts an electronic watermark into a main-body module of the program converted by program structure conversion section 30. More specifically, watermark inserting section 40 inserts into the program an electronic watermark generated from ID information for specifying a distributor. Then, watermark inserting section 40 outputs the program with the electronic watermark inserted therein to signature section 50. In addition, watermark inserting section 40 will be described specifically later.

Signature section 50 adds a digital signature to the module with the watermark inserted therein of the program output from watermark inserting section 40. A hash value of the main-body module is used in the digital signature that signature section 50 adds. Then, signature section 50 outputs the program with the digital signature added thereto to transmission section 60.

In addition, signature section 50 will be described specifically later.

Transmission section 60 packages modules of the program transmitted from signature section 50, and transmits the package and a verification program to program distribution apparatus 70 that is a terminal of a distributor of the program. The verification program is used by program use apparatuses 105a and 150b that are terminals of program users in checking the electronic watermark inserted in watermark inserting apparatus 40. In addition, transmission section 60 will be described specifically later.

In addition, the verification program is transmitted to program distribution apparatus 70 that is a terminal of a distributor of the program in Embodiment 1, but does not need to be always transmitted to program distribution apparatus 70, and may be transmitted to an independent verification program distributor.

Program distribution apparatus 70 represents a terminal of a distributor of a program such as a portal site of a communication carrier or program distributor. Program distribution apparatus 70 inserts a user ID of the program into the received program, and distributes the program to the user.

Program distribution apparatus 70 is provided with reception section 90. Reception section 90 decodes the package transmitted from transmission section 60 of program creation apparatus 10 to generate the program. Further, reception section 90 receives a verification program transmitted from transmission section 60.

Program distribution apparatus 70 is further provided with request reception section 100. Request reception section 100 is means for receiving a request message for download from a user.

Program distribution apparatus 70 is further provided with storage section 110. Storage section 110 stores a program and verification program sent from reception section 90 and a request message sent from request reception section 100.

Program distribution apparatus 70 is further provided with watermark inserting section 120. Watermark inserting section 120 extracts a main-body module and dummy module from the program stored in storage section 110, and inserts an electronic watermark into the extracted dummy module. Watermark inserting section 120 generates the electronic watermark to insert from an ID for specifying a user. Then, the section 120 outputs the program with the electronic watermark to specify the user inserted therein to signature section 130.

Signature section 130 calculates a hash value of the dummy module of the program input from watermark inserting section 120, and adds a digital signature composed of the calculated hash value and others to the input program. Signature section 130 outputs the program with the digital signature added thereto to transmission section 140.

Transmission section 140 packages modules of the program output from signature section 130, and transmits the package and verification program to program use apparatuses 150a and 150b that are terminals of users of the program.

Program use apparatuses 150a and 150b represent terminals of users on the side of using the program. Hereinafter, program use apparatus 150a is used for descriptions, and program use apparatuses 150a and 150b are simply referred to as program use apparatus 150.

Program use apparatus 150 is provided with request transmission section 160. Request transmission section 160 transmits a message to request distribution of a program to program distribution apparatus 70 that is a terminal of a distributor.

Program use apparatus 150 is further provided with reception section 170. Reception section 170 receives a package transmitted from transmission section 140 of program distribution apparatus 70, and decodes the package to make into a program. Reception section 170 further receives a verification program transmitted from transmission section 140. Then, reception section 170 outputs the decoded program and verification program to storage section 180.

Storage section 180 stores the program output from reception section 170.

Program use apparatus 150 is further provided with received module verification section 190. Received module check section 190 verifies an electronic watermark and digital signature of the program downloaded (received) by reception section 170. Then, received module verification section 190 outputs the verified program to storage section 200. In addition, received module check section 190 will be specifically described later.

Storage section 200 stores the verified program output from received module check section 190.

Program use apparatus 150 is further provided with execution section 210. Execution section 210 executes the downloaded program.

The program distribution system is configured as described above.

Figure 2:
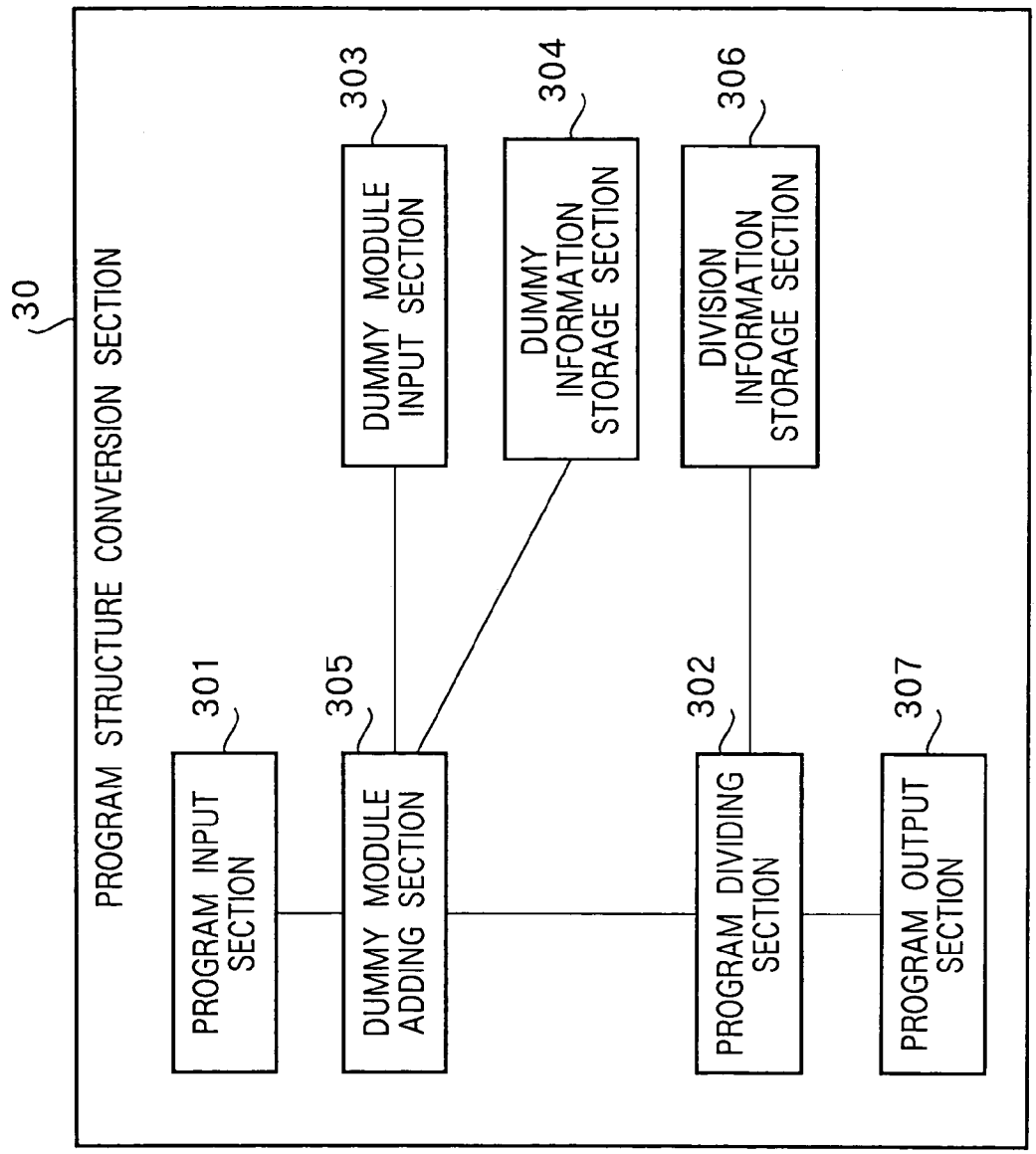
FIG. 2 is a configuration diagram of a program structure conversion section according to Embodiment 1.

Program structure conversion section 30 in Embodiment 1 will be described below with reference to FIG. 2. FIG. 2 is a configuration diagram of program conversion section 30 according to Embodiment 1.

Program structure conversion section 30 is provided with program input section 301. Program input section 301 receives a program to which a dummy module is added to be divided into a plurality of modules. Program input section 301 outputs the program to dummy module adding section 305.

Dummy module adding section 305 adds a dummy module input from dummy module input section 303 to the program input from program input section 301, and outputs the program to program dividing section 302. It is preferable that a dummy module is called at least once by a main-body module using the assert method or the like when dummy module adding section 305 adds the dummy module.

The assert method is one for replacing an assert statement with an if statement that always makes false in a program, and adding a call statement for the dummy module to the if statement. Details are described in "Watermark for software and its Insertion, Attacking, Evaluation and Implementation methods", Yuji Ichisugi, Information Processing Society of Japan, Summer Symposium on Programming.

Dummy module adding section 305 provides a name of the added dummy module to dummy information storage section 304.

Program dividing section 302 divides the program to which the dummy module is added in dummy module adding section 305 into a plurality of modules. For example, program dividing section 302 may obtain a compiled class file as a module when the program is written in Java® or may obtain a compiled object file as a module when the program is written in C. Program dividing section 302 outputs the number of divided modules to division information storage section 306.

Program output section 307 outputs the program to which the dummy module is added in dummy module adding section 305 and which is divided into a plurality of modules in program dividing section 302.

In this constitution, program structure conversion section 30 adds a dummy module to a program and divides the program with the dummy module added thereto into a plurality of modules.

Figure 3:
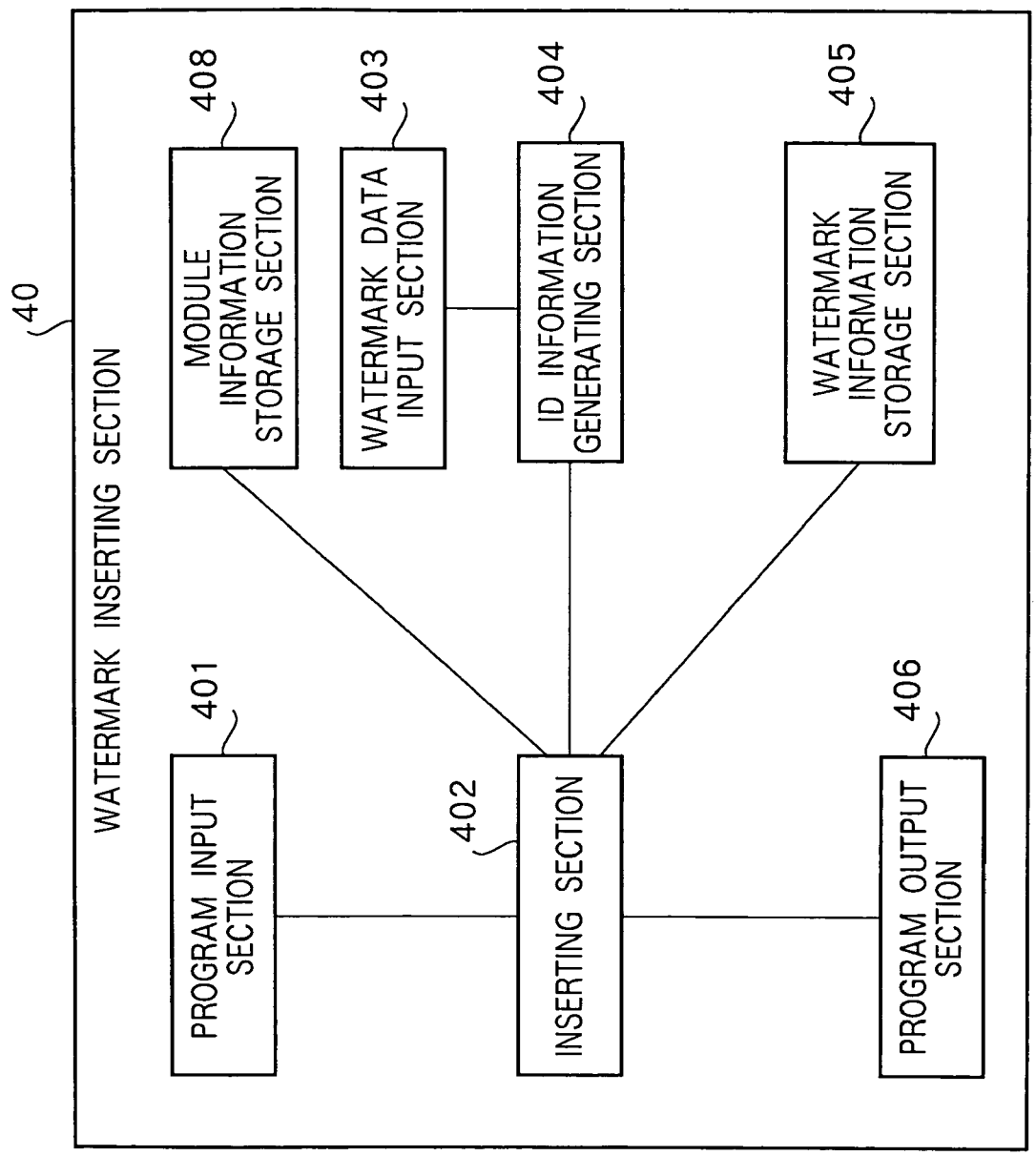
FIG. 3 is a configuration diagram of a watermark inserting section according to Embodiment 1.

Watermark inserting section 40 in Embodiment 1 will be described below with reference to FIG. 3. FIG. 3 is a configuration diagram of watermark inserting section 40 in Embodiment 1.

Watermark inserting section 40 is provided with program input section 401. Program input section 401 receives a program to input a watermark, i.e. receives the program converted in program structure conversion section 30. Program input section 401 outputs the input program to inserting section 402.

Watermark data input section 403 inputs data (watermark data) to be inserted as a watermark. The watermark data to input is information for specifying program distribution apparatus 70 i.e. a distributor, and includes an address, telephone number, company name, person name, and/or e-mail address of the distributor. Information of a creator (program creation apparatus 10) of the program may be input to the watermark data.

ID information generating section 404 generates ID information for uniquely specifying the distributor (program distribution apparatus 70) from the watermark data input from watermark data input section 403. The ID information may be the input data itself or data obtained by encrypting the input data. Further, the ID information may be an ID for uniquely specifying the watermark data in a database storing watermark data.

In addition, Embodiment 1 describes generating watermark based on ID information. However, the watermark does not need to be always generated based on the ID information, and is only required to enable a distribution destination to be uniquely specified from the watermark. For example, it may be possible that sequence numbers 1 to N are inserted into modules to transmit, and a module of sequence number i is distributed to the distributor (program distribution apparatus 70), so that the watermark and distribution destination can be uniquely specified.

Module information storage section 408 stores a name of the dummy module added in program structure conversion section 30. Module information storage section 408 beforehand acquires the dummy module name from dummy information storage section 304 of program structure conversion section 30 to store.

Inserting section 402 generates a watermark to actually insert into a program from the ID information generated in ID information generating section 404, distinguishes between the dummy module and main-body module using the dummy module name obtained from module information storage section 408, and inserts the watermark into the main-body module. Further, inserting section 402 outputs a name of the main-body module to which the watermark is inserted to watermark information storage section 405.

As the watermark information that inserting section 402 inserts, it may be possible to insert not only a distributor ID but also other information such as program right information, access control information of user terminal, and security policy.

For example, the program right information includes an execution expiration date and/or the number of execution times of the program, and/or permission of program transfer to other terminals, and the access control information and security policy information is information on access to terminal resource such as permission of read and write in memory/HD and permission of use of socket.

Watermark information storage section 405 stores a name of the module with the watermark inserted therein.

Program output section 406 outputs the program to which the watermark is inserted in inserting section 402.

In this constitution, watermark inserting section 40 inserts a watermark for specifying a distributor into a main-body module.

Figure 4:
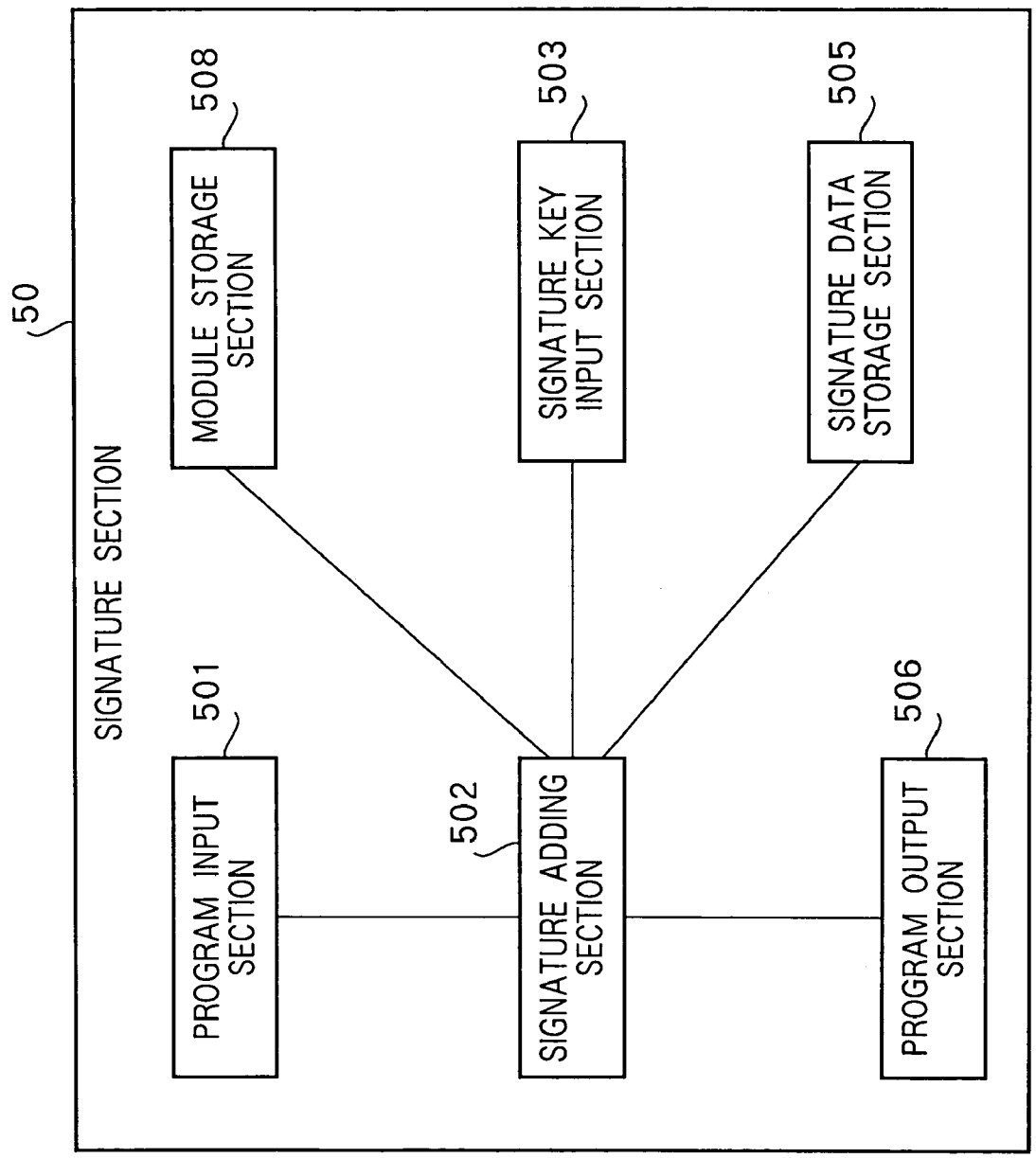
FIG. 4 is a configuration diagram of a signature section in Embodiment 1.

Signature section 50 according to Embodiment 1 will be described below with reference to FIG. 4. FIG. 4 is a configuration diagram of signature section 50 in Embodiment 1.

Signature section 50 is provided with program input section 501. Program input section 501 receives a program to add a signature i.e. the program output from watermark inserting section 40. Program input section 501 outputs the input program to signature adding section 502.

Module information storage section 508 stores a name of the dummy module added in program structure conversion section 30. Module information storage section 508 beforehand acquires the dummy module name from dummy information storage section 304 in program structure conversion section 30 to store.

Signature key input section 503 inputs a secret key to encrypt a signature.

Signature adding section 502 distinguishes between a main-body module and dummy module using the dummy module name obtained from module information storage section 508, and calculates a hash value of the main-body module. Then, signature adding section 502 encrypts the calculated hash value using a secret key (creator secret key) input from signature key input section 503.

Signature adding section 502 makes the module, hash value that is the signature, and a certificate containing a public key (creator public key) for signature verification into a single file using a signature format. Further, signature adding section 502 associates the module name with the hash value to output to signature data storage section 505.

Signature data storage section 505 stores the module name and hash value output from signature adding section 502 in association with each other.

Program output section 506 outputs the program having the signature that is added in signature adding section 502 and others.

In this constitution, signature section 50 adds a signature to a main-body module, and encrypts the signature with a secret key.

Figure 5:
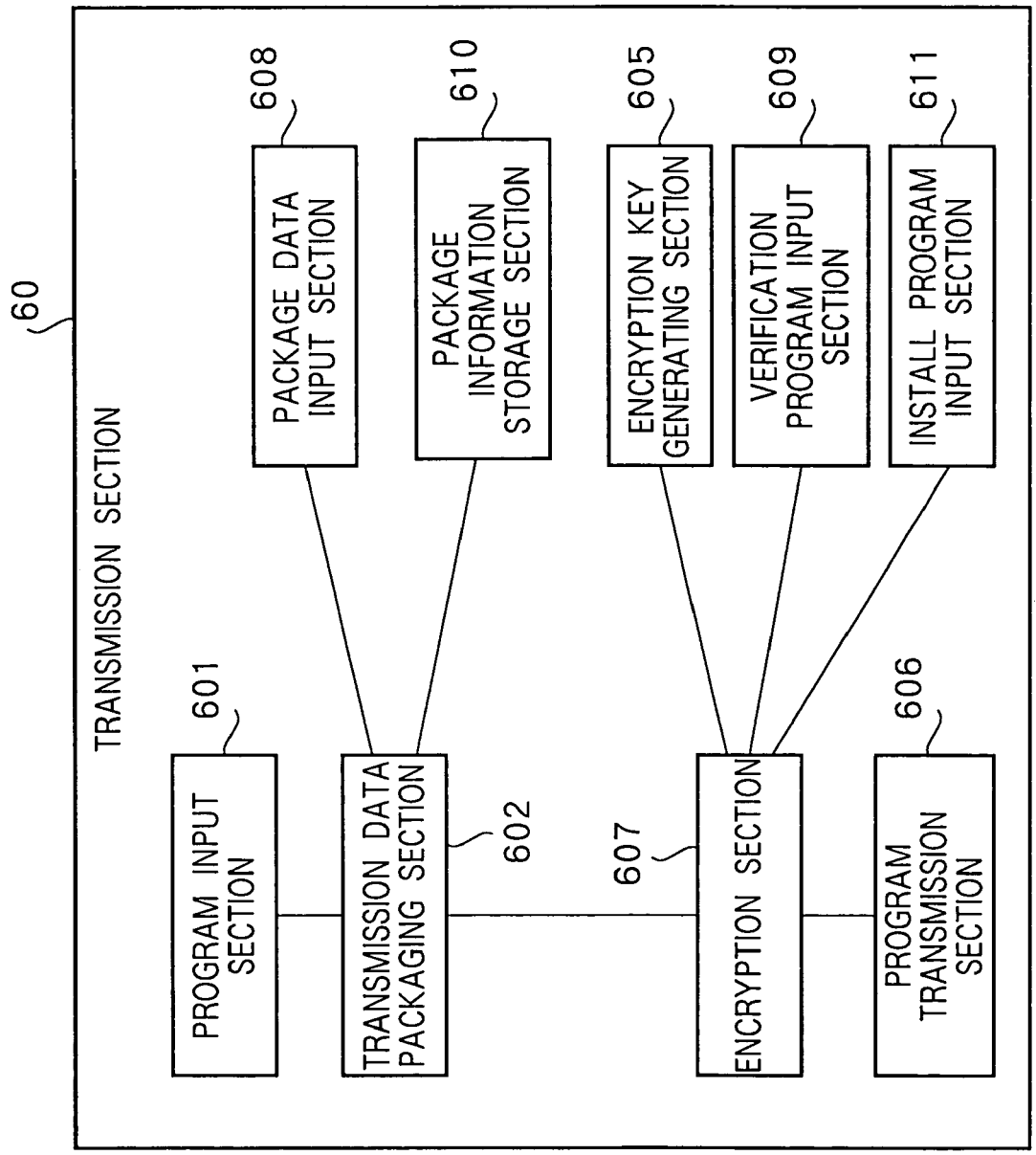
FIG. 5 is a configuration diagram of a transmission section in Embodiment 1.

Transmission section 60 according to Embodiment 1 will be described below with reference to FIG. 5. FIG. 5 is a configuration diagram of transmission section 60 in Embodiment 1.

Transmission section 60 is provided with program input section 601 that receives a program output from signature section 50. Program input section 601 receives as its input a program to transmit to a distributor i.e. program distribution apparatus 70. Program input section 601 outputs the input program to transmission data packaging section 602.

Transmission data packaging section 602 compiles various data including the program, and generates a distributor package to transmit to the distributor i.e. program distribution apparatus 70. Further, transmission data packaging section 602 provides a data size or CRC size of the program packaged for a distributor to package information storage section 610. In addition, the distributor package will be specifically described later.

Package data input section 608 inputs a file describing a dummy module name.

Encryption key generating section 605 generates an encryption key for communications. More specifically, encryption key generating section 605 generates an encryption key used in dealing the package between the creator and distributor i.e. program creation apparatus 10 and program distribution apparatus 70.

Verification program input section 609 inputs a verification program to verify a watermark inserted in watermark inserting section 40.

Install program input section 611 inputs software for a user i.e. program use apparatus 150 to install the program transmitted from the distributor i.e. program distribution apparatus 70.

Encryption section 607 encrypts the packaged program and the watermark verification program input from verification program input section 609, using the encryption key for communications generated in encryption key generating section 605, to output to program transmission section 606.

Program transmission section 606 transmits to program distribution apparatus 70 the program that is packaged in transmission data packaging section 602 and encrypted in encryption section 607.

Figure 6:
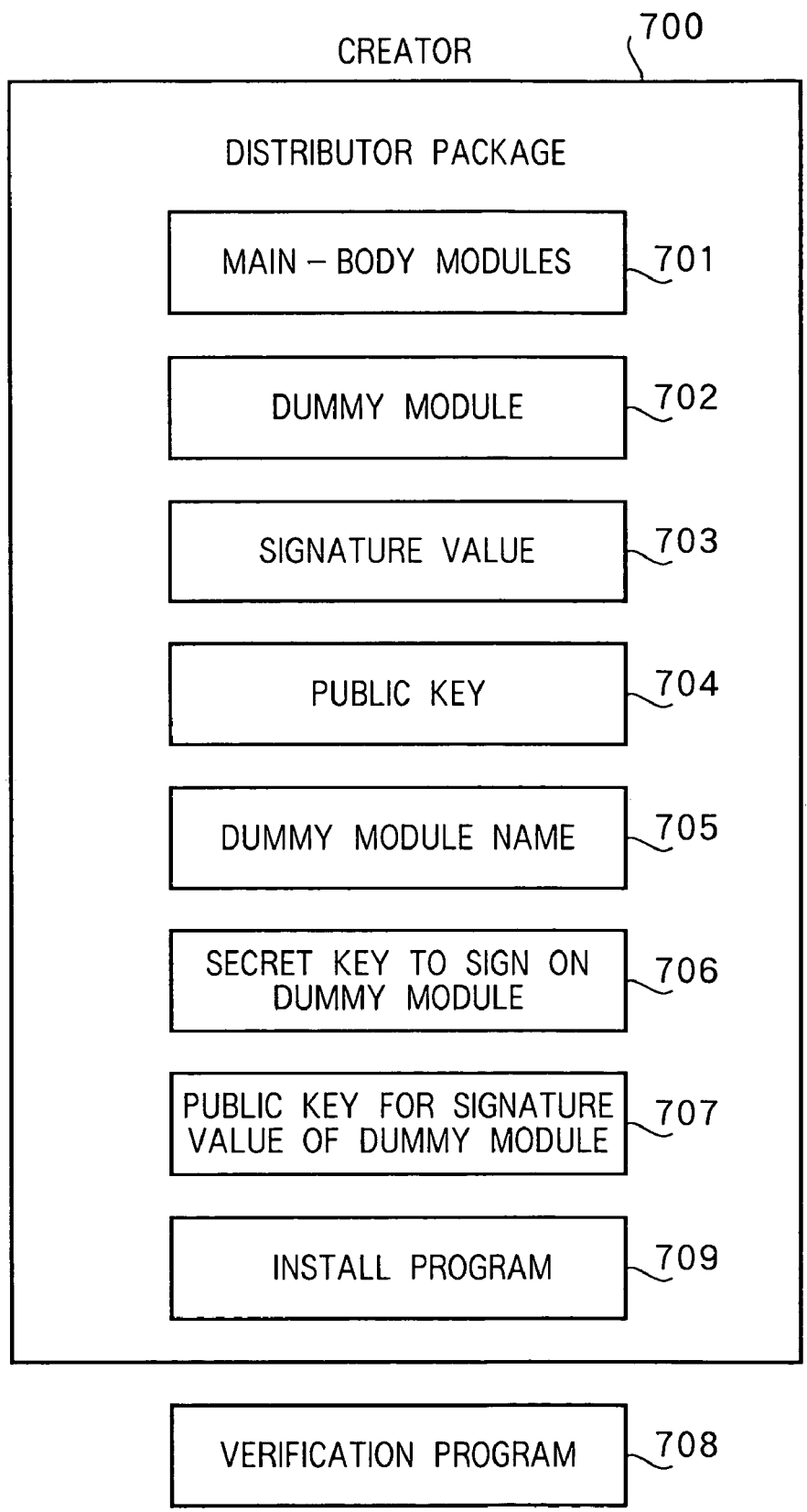
FIG. 6 is a configuration diagram of a distributor package according to Embodiment 1.

A distributor package generated in transmission data packaging section 602 will be described below with reference to FIG. 6. FIG. 6 is a configuration diagram of a distributor package according to Embodiment 1.

Distributor package 700 is comprised of main-body modules 701, dummy module 702, signature value 703 of the main-body modules calculated in signature adding section 502 of signature section 50, public key (creator public key) 704 to decode signature value 703 encrypted with a secret key, file 705 describing a dummy module name, secret key (creator secret key) 706 to sign on the dummy module, public key (creator public key) 707 to decode the signature on the dummy module, and install program 709.

It is herein assumed that with respect to public key 704 and 707, certificates are issued by a Certification Authority, and a certificate containing a public key is referred to as the public key hereinafter.

Considered as examples of packaging are a jar file and tar file, and a packaged file may be compressed.

Program transmission section 606 transmits verification program 708 together with distributor package 700 to program distribution apparatus 70. By this means, another terminal is capable of checking the watermark added by program creation apparatus 10.

In addition, secret key (creator secret key) 706 to sign on the dummy module is distributed herein, but does not need to be always distributed. Further, it is preferable at this point that install program 709 and watermark verification program 708 are protected by a tamper resistant software method to make difficult-to-read, for example. It is thus possible to prevent deletion and tampering of the watermark by improperly analyzing the operation of install program 709 and verification program 708.

Figure 7:
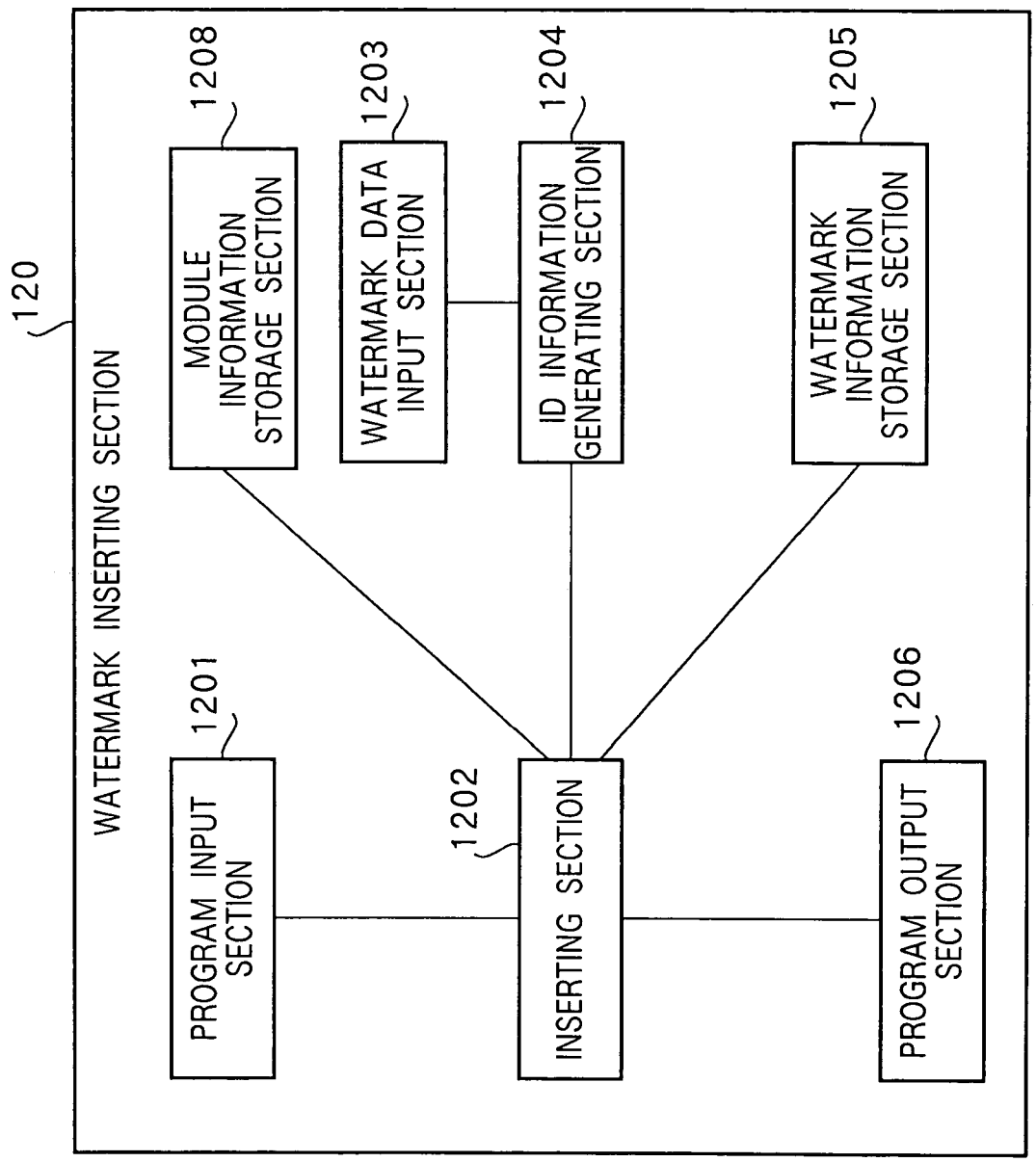
FIG. 7 is a configuration diagram of a watermark inserting section in Embodiment 1.

Watermark inserting section 120 in Embodiment 1 will be described below with reference to FIG. 7. FIG. 7 is a configuration diagram of watermark inserting section 120 in Embodiment 1.

Program input section 1201 receives a program to input an extracted watermark from storage section 110. Program input section 1201 outputs the input program to inserting section 1202.

Watermark data input section 1203 inputs data (watermark data) to be inserted as a watermark. The watermark data to input is information for specifying program use apparatus 150 i.e. a user, and includes an address, telephone number, company name, person name, and/or e-mail address of the user. Information of a distributor (program distribution apparatus 70) of the program may be input to the watermark data.

ID information generating section 1204 generates ID information for uniquely specifying the user from the watermark data input from watermark data input section 1203. The ID information may be the input data itself or data obtained by encrypting the input data. Further, the ID information may be an ID for uniquely specifying the watermark data in a database storing watermark data.

Inserting section 1202 generates a watermark to actually insert into a program from the ID information generated in ID information generating section 1204, distinguishes between the dummy module and main-body module using the dummy module name obtained from module information storage section 1208, and inserts a user ID that is the watermark into the dummy module. Further, inserting section 1202 outputs a name of the module to which the watermark is inserted to watermark information storage section 1205.

Watermark information storage section 1205 stores a name of the module with the watermark inserted therein.

Program output section 1206 outputs the program to which the watermark is inserted in inserting section 1202.

In this constitution, watermark inserting section 120 inserts a watermark for specifying a user into a dummy module.

In addition, Embodiment 1 describes generating watermark information based on ID information. However, the watermark information does not need to be always generated based on the ID information, and is only required to enable a user to be uniquely specified from the watermark information. For example, it may be possible that sequence numbers 1 to N are inserted into modules to transmit, and a module of sequence number i is distributed to the user (program use apparatus 150), so that the watermark information and user can be uniquely specified.

Further, it maybe possible to insert as the watermark information not only a user ID but also program right information, access control information of user terminal, and security policy.

For example, the program right information includes an execution expiration date and/or the number of execution times of the program, and/or permission/prohibition of program transfer to other terminals, and the access control information and security policy information is information on access to terminal resource such as permission of read and write in memory/HD and permission of use of socket.

Figure 8:
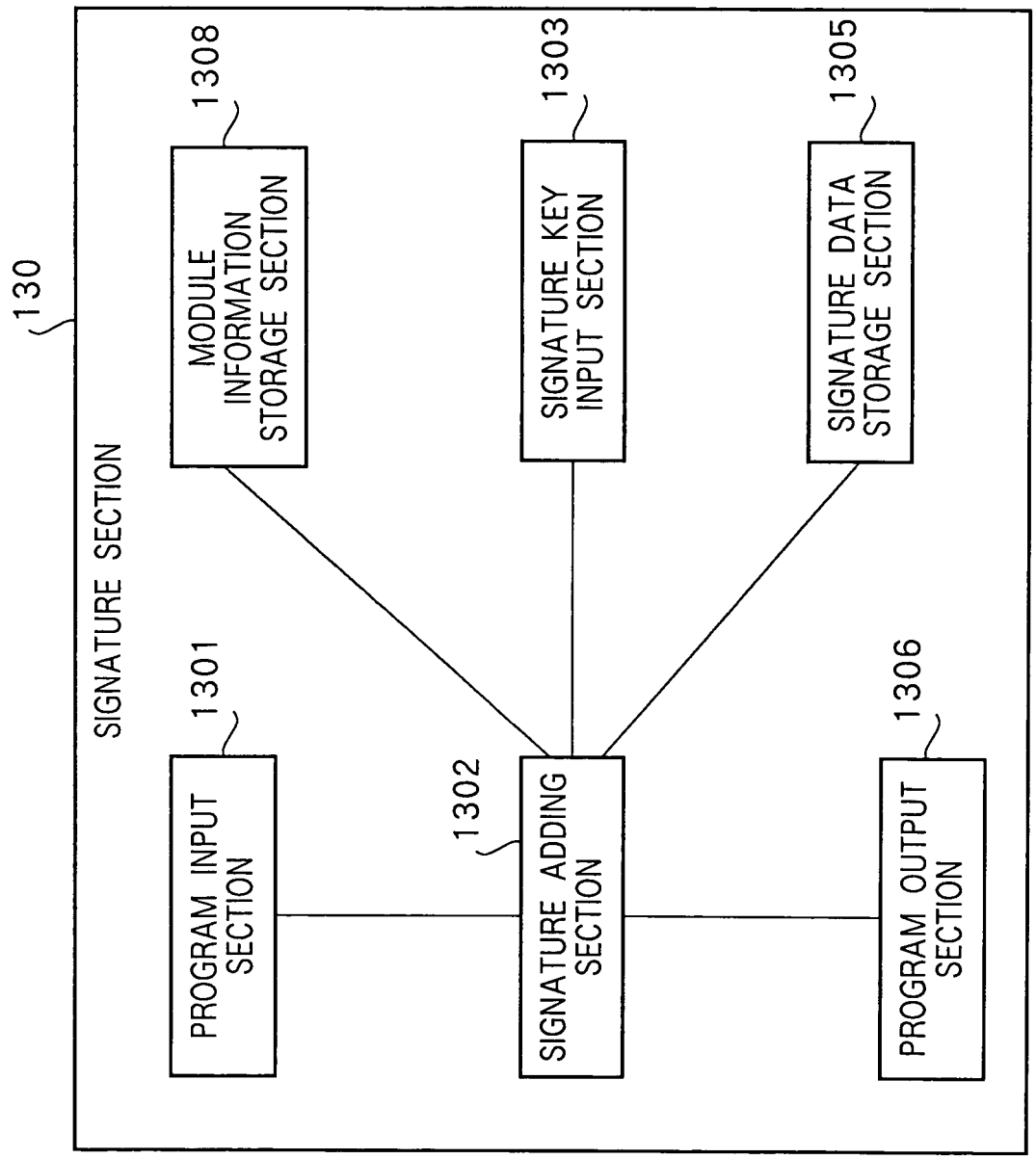
FIG. 8 is a configuration diagram of a signature section in Embodiment 1.

Signature section 130 according to Embodiment 1 will be described below with reference to FIG. 8. FIG. 8 is a configuration diagram of signature section 130 in Embodiment 1.

Signature section 130 is provided with program input section 1301. Program input section 1301 receives a program to add a signature i.e. the program output from watermark inserting section 120. Program input section 1301 outputs the input program to signature adding section 1302.

Module information storage section 1308 stores dummy module name 705 of distributor package 700 transmitted from program creation apparatus 10.

Signature key input section 1303 stores secret key 706 to sign on the dummy module and public key 707 to decode a signature value of the dummy module of distributor package 700 transmitted from program creation apparatus 10.

Signature adding section 1302 distinguishes between a main-body module and dummy module using the dummy module name obtained from module information storage section 1308, and calculates a hash value of the dummy module. Then, signature adding section 1302 encrypts the hash value of the dummy module using secret key (creator secret key) 706 input from signature key input section 1303.

Signature adding section 1302 makes the module, hash value, and a public key certificate for signature verification into a single file. Further, signature adding section 1302 associates the module name with the hash value to output to signature data storage section 1305, and further outputs secret key 706 for the dummy module and public key 707 for the dummy module.

Program output section 1306 outputs the program having the signature that is added in signature adding section 1302.

In this constitution, signature section 130 signs on a dummy module, and encrypts the signature with a secret key of the creator.

Figure 9:
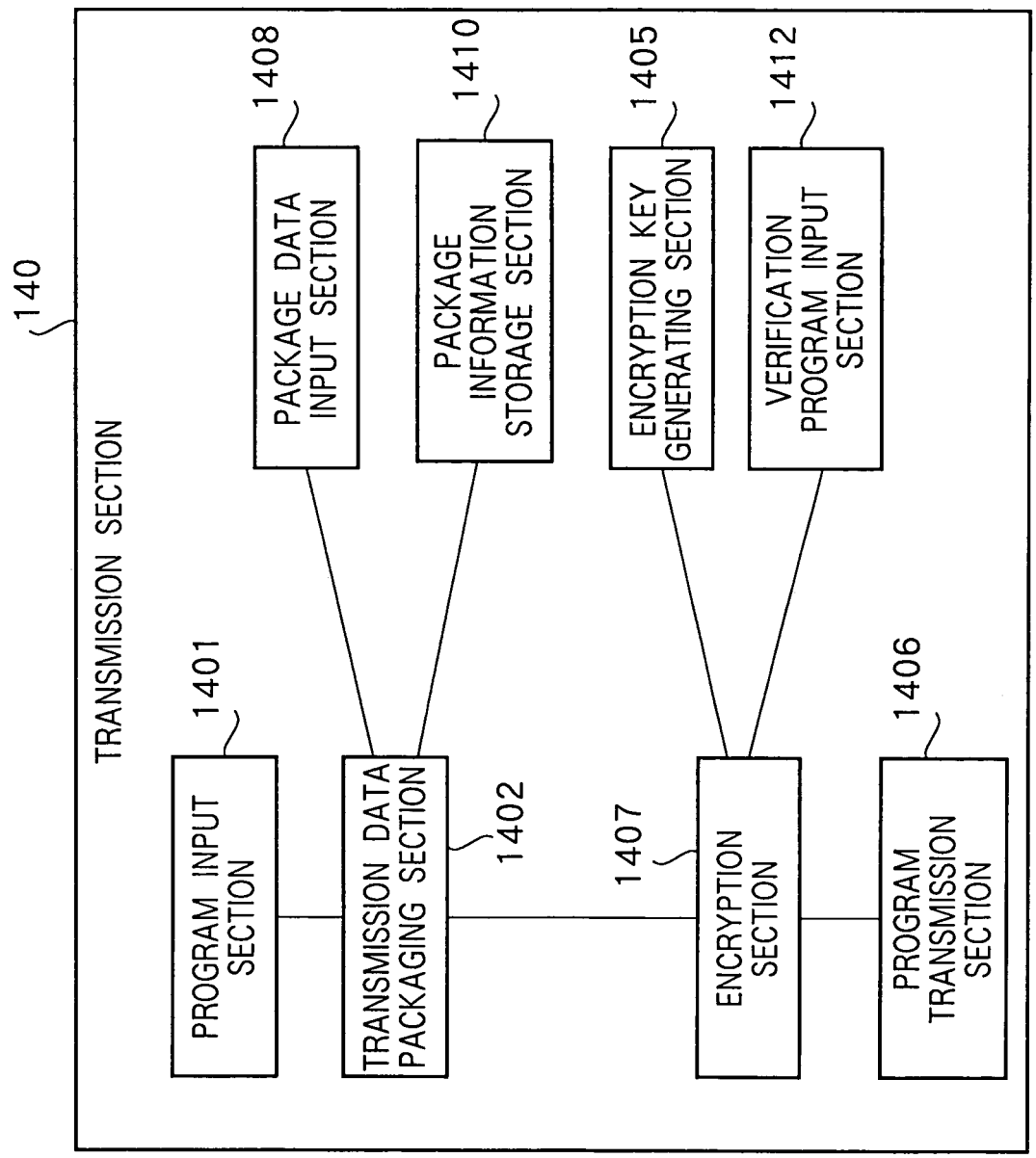
FIG. 9 is a configuration diagram of a transmission section in Embodiment 1.

Transmission section 140 according to Embodiment 1 will be described below with reference to FIG. 9. FIG. 9 is a configuration diagram of transmission section 140 in Embodiment 1.

Transmission section 140 is provided with program input section 1401 that receives a program output from signature section 130. Program input section 1401 outputs the input program to transmission data packaging section 1402.

Transmission data packaging section 1402 compiles various data including the program, and generates a user package to transmit to the user (program use apparatus 150). Further, transmission data packaging section 1402 provides a data size or CRC size of the program packaged for a user to package information storage section 1410.

In addition, the user package will be specifically described later.

Package data input section 1408 receives distributor package 700 transmitted from the creator i.e. program creation apparatus 10.

Encryption key generating section 1405 generates an encryption key for communications. More specifically, encryption key generating section 1405 generates an encryption key used in dealing the package between the program distribution apparatus 70 and program use apparatus 150.

Verification program input section 1412 inputs a verification program to check a watermark inserted in watermark inserting section 40.

Encryption section 1407 encrypts the packaged program and the watermark verification program input from verification program input section 1412, using the encryption key for communications generated in encryption key generating section 1405.

Program transmission section 1406 transmits to program use apparatus 150 the program that is packaged in transmission data packaging section 1402 and encrypted in encryption section 1407.

Figure 10:
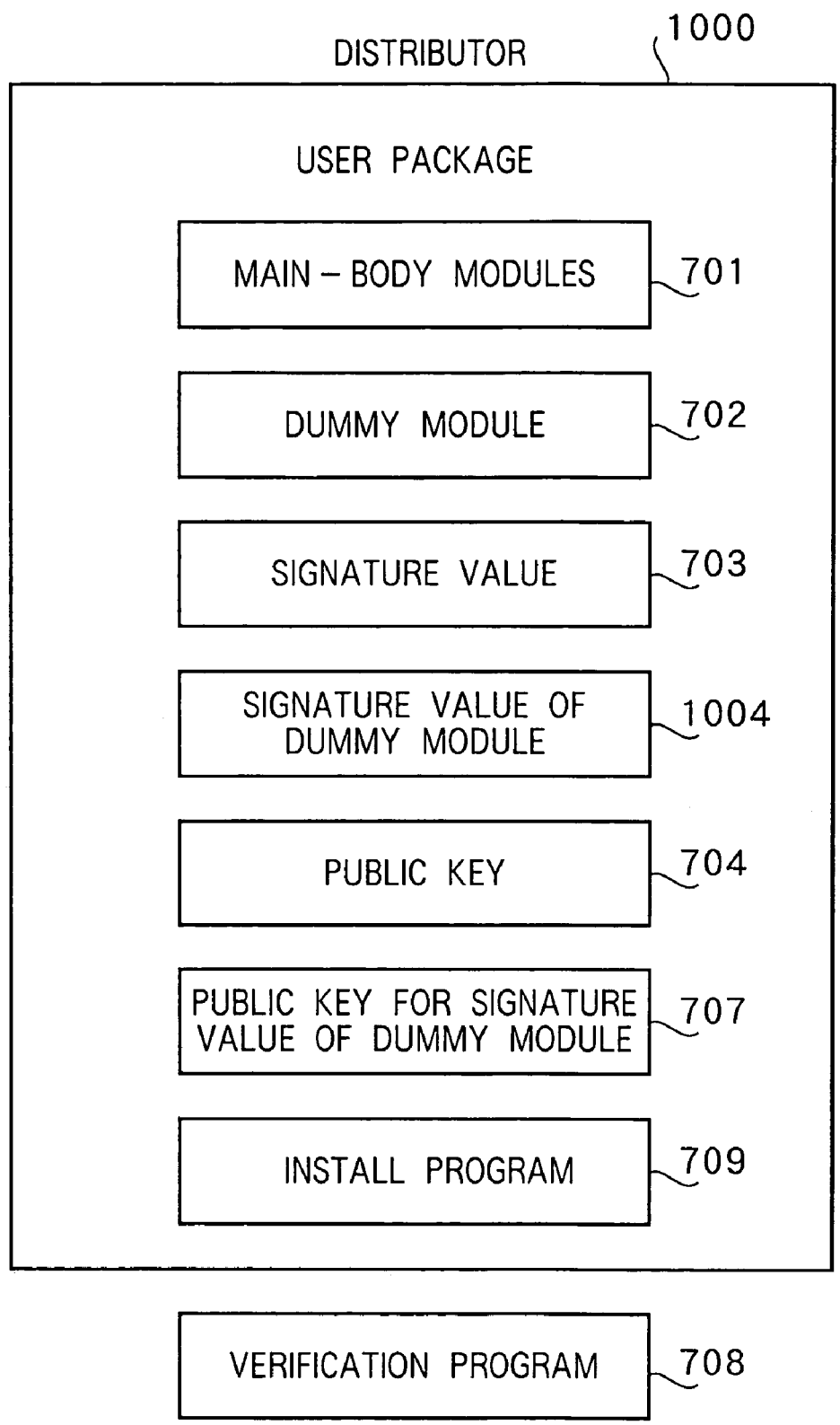
FIG. 10 is a configuration diagram of a user package according to Embodiment 1.

A user package generated in transmission data packaging section 1402 will be described below with reference to FIG. 10. FIG. 10 is a configuration diagram of a user package according to Embodiment 1.

User package 1000 is comprised of main-body modules 701, dummy module 702, signature value 703 of the main-body modules contained in distributor package 700, signature value 1004 of the dummy module calculated in signature adding section 1302 of signature section 130, public key (creator public key) 704 for signature value 703 of the main-body module contained in distributor package 700, public key (creator public key) 707 for signature value 1004 of the dummy module, and install program 709.

Considered as examples of packaging are a jar file and tar file, and a packaged file may be compressed.

Program transmission section 1406 transmits verification program 708 together with user package 1000 to program use apparatus 150.

Figure 11:
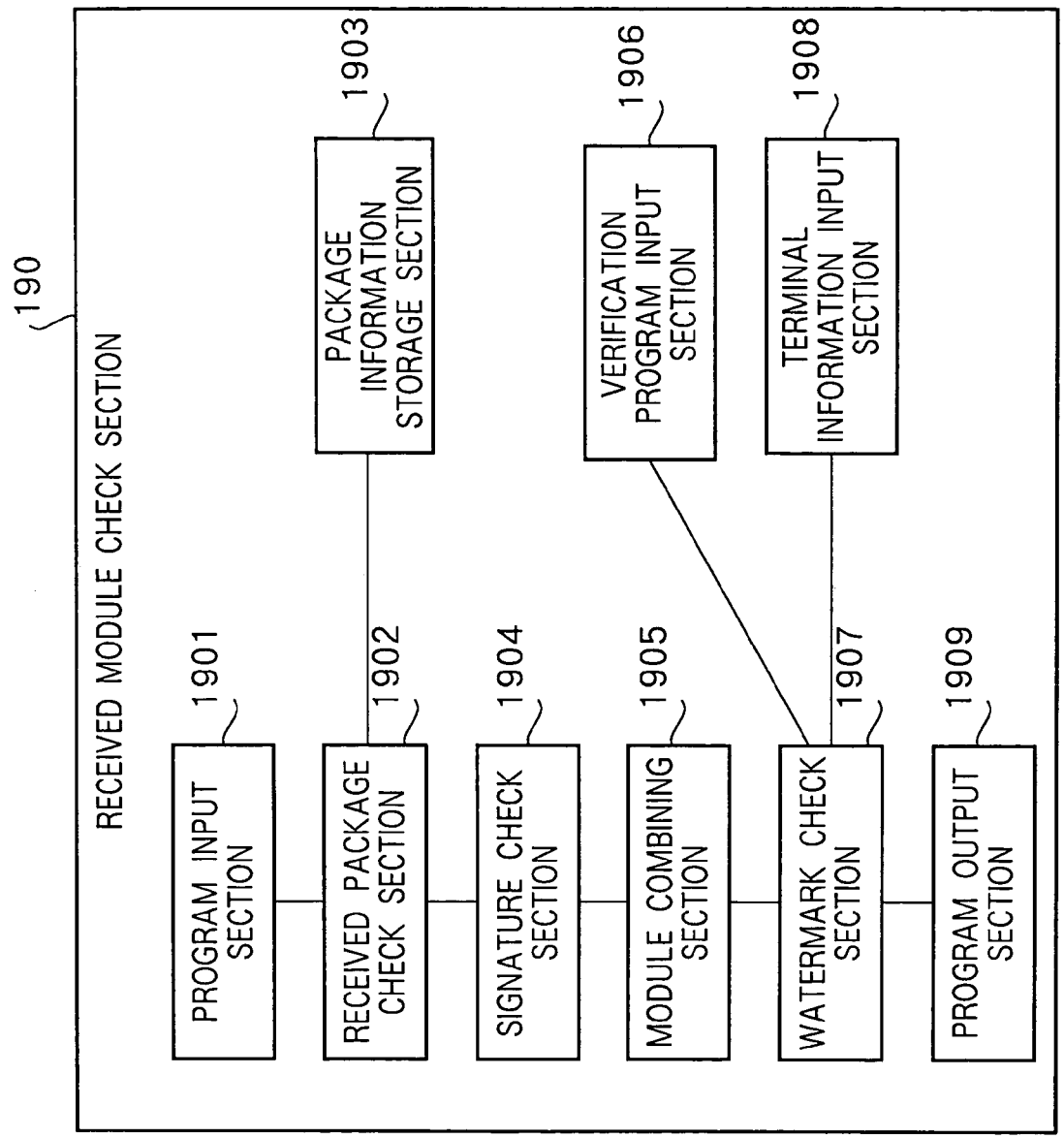
FIG. 11 is a configuration diagram of a received module check section in Embodiment 1.

Received module check section 190 according to Embodiment 1 will be described below with reference to FIG. 11. FIG. 11 is a configuration diagram of received module check section 190 in Embodiment 1.

Received module check section 190 is provided with program input section 1901. Program input section 1901 receives a program targeted for check and combination of each module output from reception section 170. Program input section 1901 outputs the program to received package check section 1902.

Package information storage section 1903 stores a size or CRC size of the package received from the distributor (program distribution apparatus 70). Package information storage section 1903 beforehand acquires the size of the package from program distribution apparatus 70.

Received package check section 1902 determines whether the package received from the distributor (program distribution apparatus 70) is complete one. More specifically, received package check section 1902 checks whether the size or CRC size of the package obtained from package information storage section 1903 is in agreement with the size of the received package. When the size or CRC size of the package obtained from package information storage section 1903 is in agreement with the size of the received package, received package check section 1902 outputs the program to signature check section 1904. Meanwhile, when such sizes are not in agreement, the section 1902 discards the received package.

Signature check section 1904 is means for verifying whether the signature of all the received modules is correct, and calculates a hash value of each of the received modules. Next, signature check section 1904 decodes signature values (hash values) 703 and 1004 of the module described in user package 1000, using public key 704 for the main-body module and public key 707 to decode signature value 1004 of the dummy module added to the user package, respectively. Then, signature check section 1904 compares the calculated signature value with the signature value added to the module, and when the values are in agreement with each other, outputs the program to module combining section 1905, while discarding all the modules received from the distributor when the values are not in agreement with each other.

Module combining section 1905 combines all the modules received from the distributor into a single piece to generate the original program.

Verification program input section 1906 inputs a watermark verification program obtained from the distributor i.e. program distribution apparatus 70.

Terminal information input section 1908 inputs a terminal ID (user ID) of program use apparatus 150.

Watermark check section 1907 extracts a watermark of the combined program, and determines whether the watermark is in agreement with the terminal ID.

More specifically, using the verification program input from verification program input section 1906, watermark check section 1907 extracts the watermark of the program generated in module combining section 1905, and compares the watermark with the terminal ID input from terminal information input section 1908. Then, when the watermark of the program generated in module combining section 1905 is in agreement with the terminal ID input from terminal information input section 1908, the section 1907 outputs the program to program output section 1909, while discarding the generated program when the watermark is not agreement with the terminal ID.

Program output section 1909 outputs the program having passed all the checks.

In this constitution, received module check section 190 judges on whether or not the program is authorized using signature values of the main-body module and dummy module. Further, received module check section 190 judges on whether or not the program is authorized using the watermark.

In addition, the verification program may be integrally added to a program and transmitted from program distribution apparatus 70 to program use apparatus 150.

Figure 12:
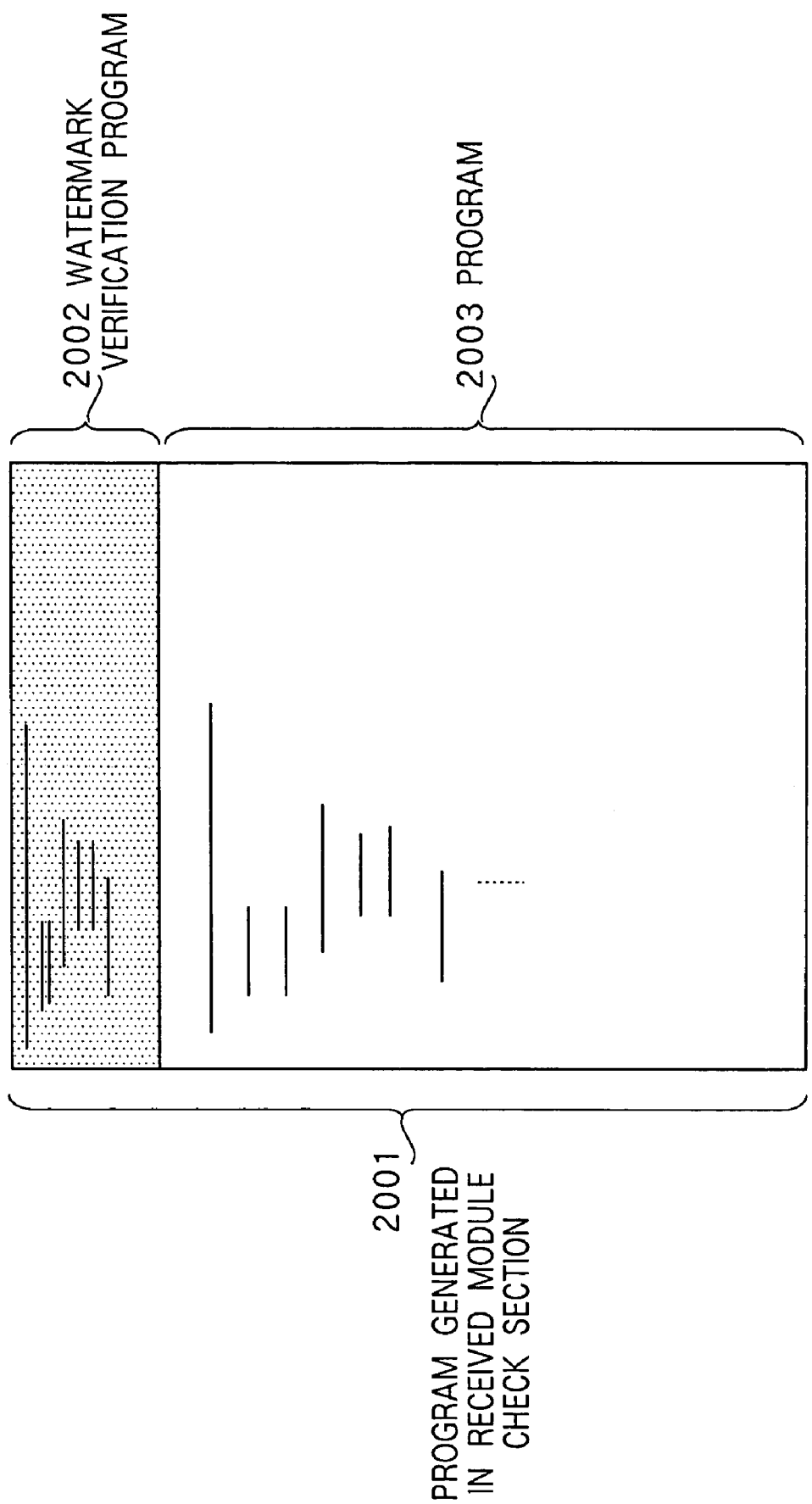
FIG. 12 is a chart showing an example of a program integrally provided with a watermark verification program in Embodiment 1.

FIG. 12 shows program example 2001 to which a watermark verification program is integrally added.

Figure 13:
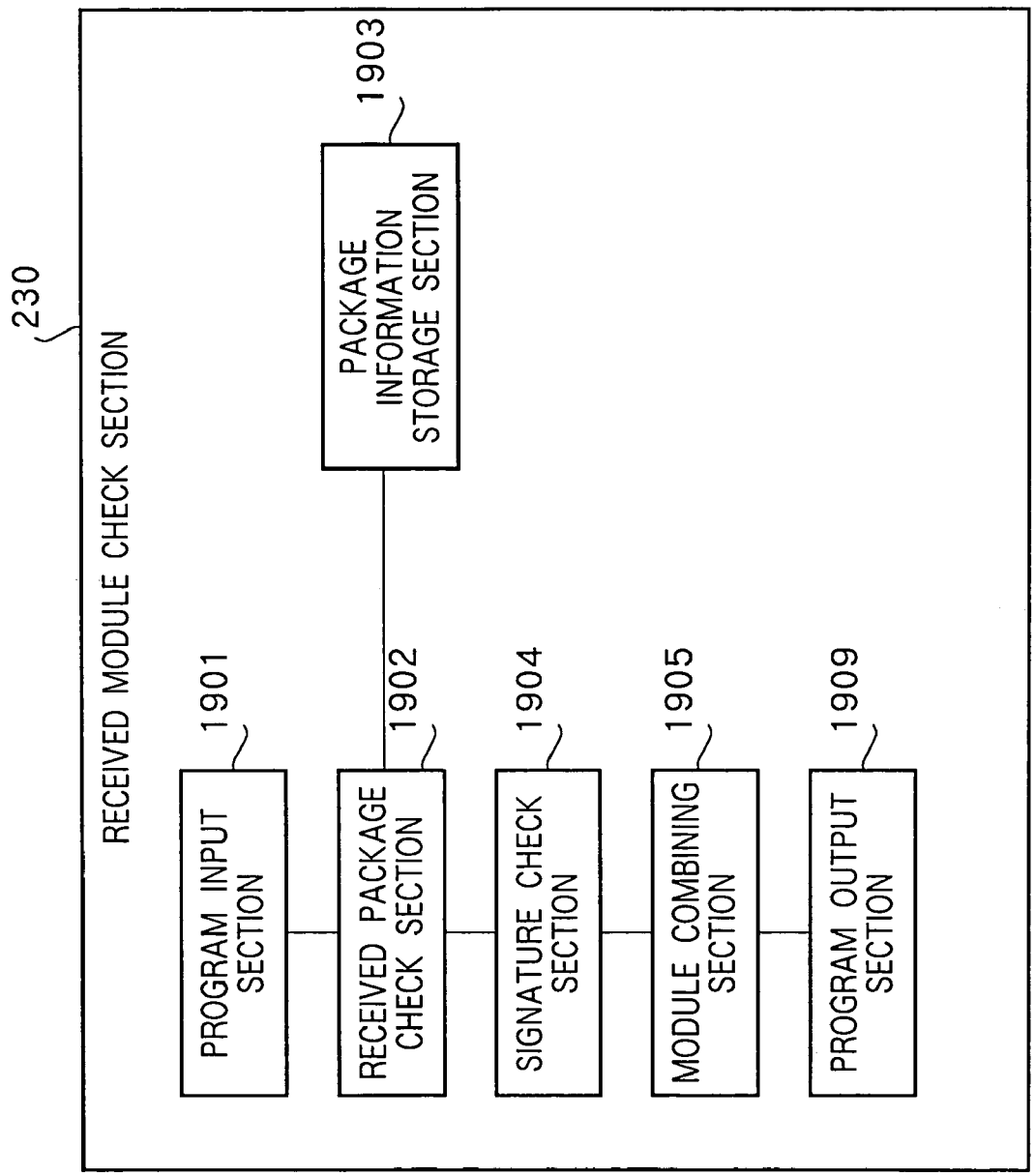
FIG. 13 is a configuration diagram of a received module check section when the watermark verification program is integrally provided in Embodiment 1.

FIG. 13 illustrates a received module check section in this case. Received module check section 230 in this case does not have verification program input section 1906 and terminal information input section 1908.

When the program is executed in execution section 210, the verification program 2002 is first executed, and a watermark inserted into main-body program 2003 is extracted and compared with a terminal ID. When the watermark is in agreement with the terminal ID, execution of main-body program 2003 is initiated.

It is thus possible to operate the program to which the watermark verification program is added.

Figure 14:
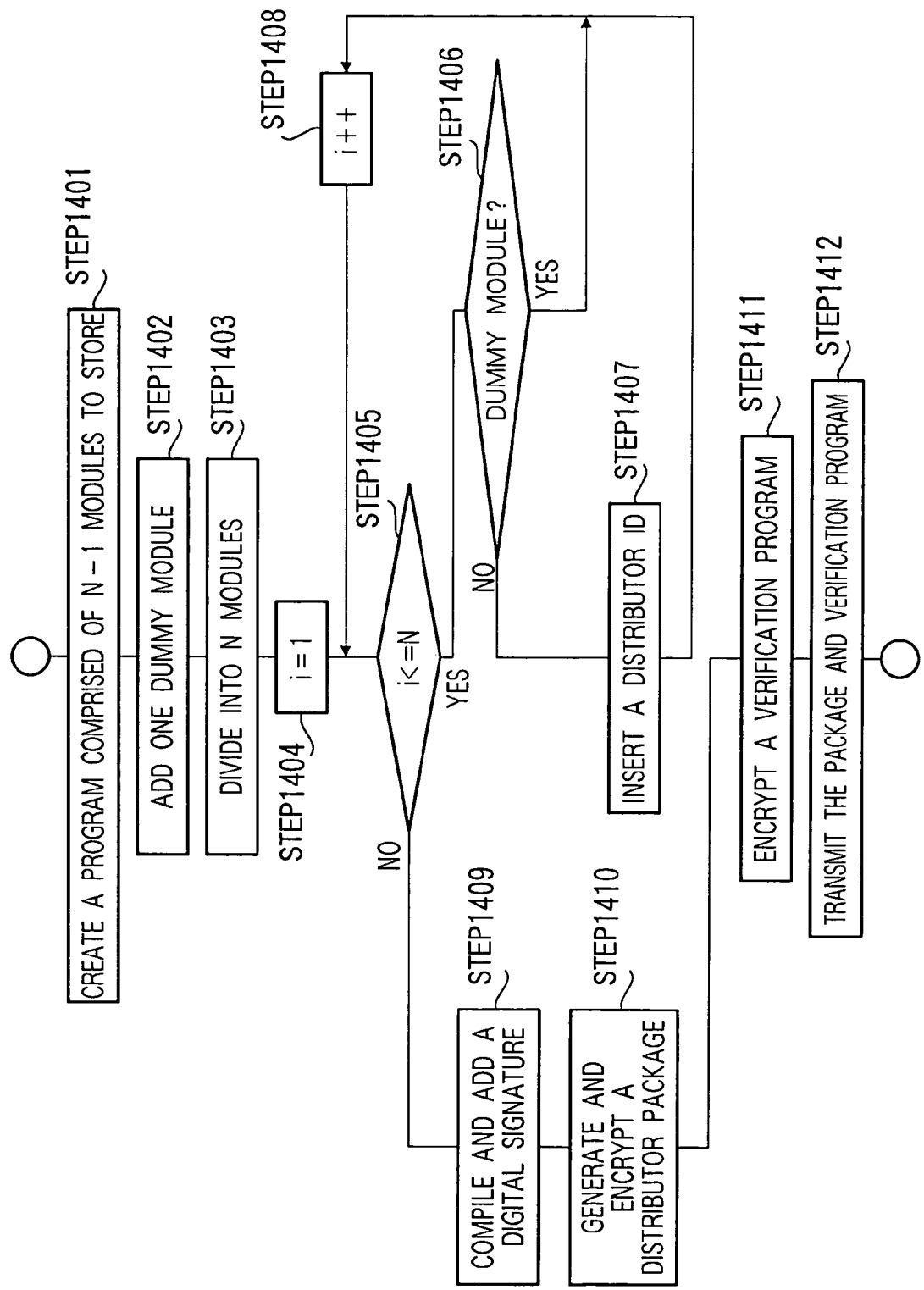
FIG. 14 is a flowchart showing the operation of a program creation apparatus in Embodiment 1.
Figure 15:
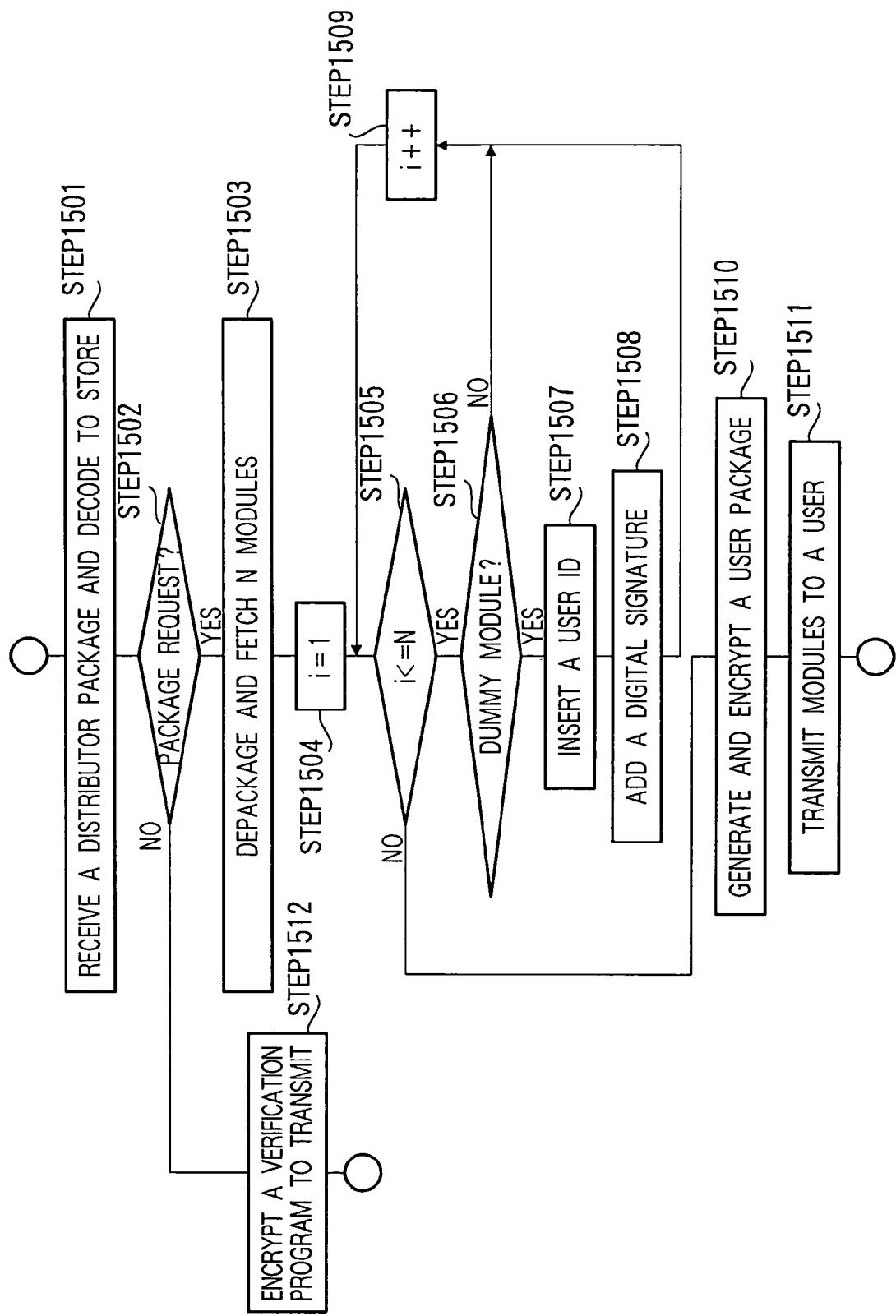
FIG. 15 is a flowchart on the operation of a program distribution apparatus in Embodiment 1.
Figure 16:
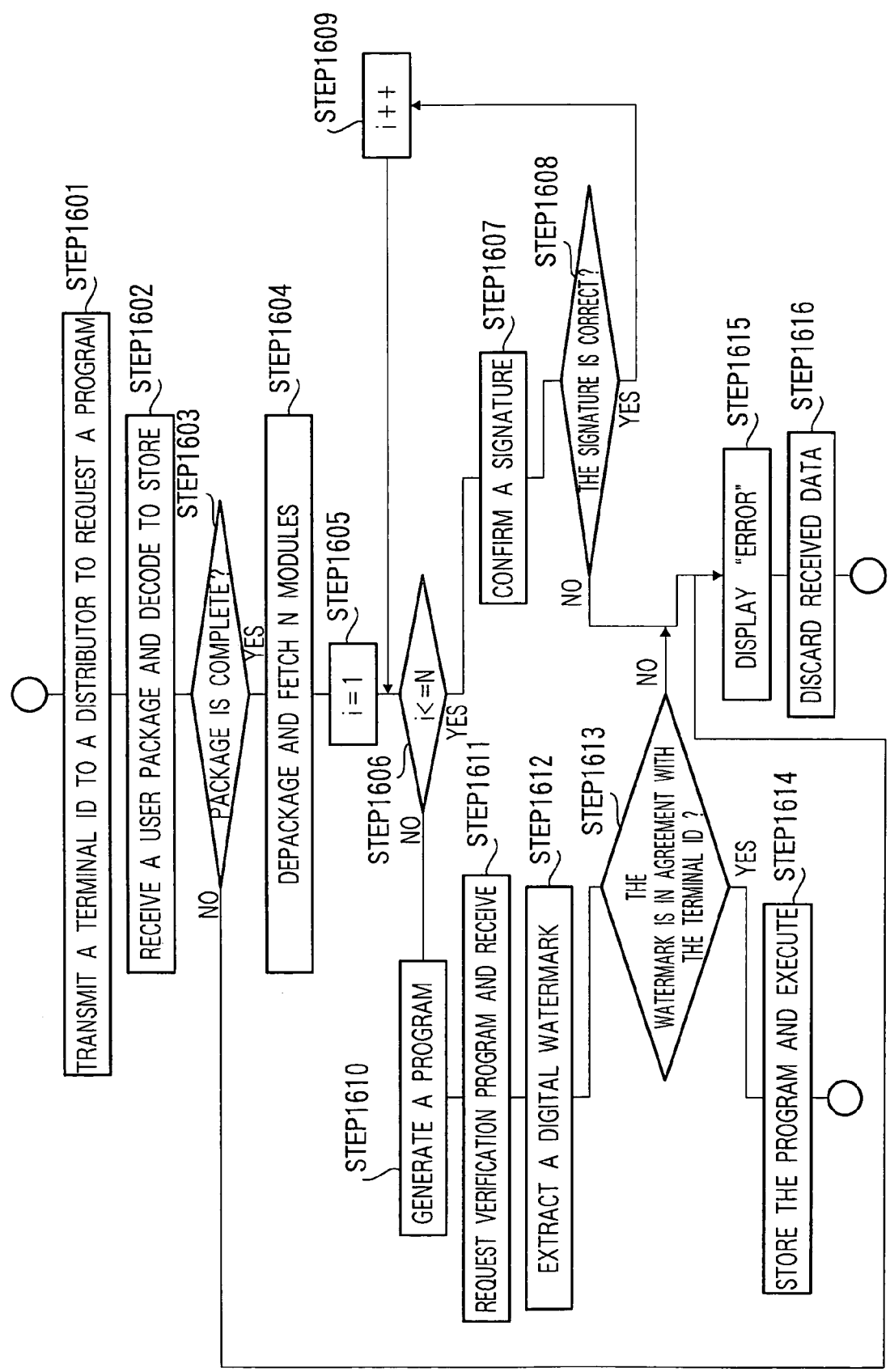
FIG. 16 is a flowchart on the operation of a program use apparatus in Embodiment 1.

With reference to FIGS. 14 to 16, the operation will be described below when a program created in program creation apparatus 10 of a creator is transmitted to program distribution apparatus 70 and downloaded to program use apparatus 150 of a user.

FIG. 14 is a flowchart showing the operation of program creation apparatus 10 in Embodiment 1.

Program creation apparatus 10 receives as its input a created program comprised of N−1 modules to store in storage section 20 (step 1401).

Next, in program creation apparatus 10, program input section 301 in program structure conversion section 30 receives the program stored in storage section 20. Dummy module adding section 305 in program structure conversion section 30 receives a dummy module for a distributor to insert a user ID from dummy module input section 303. Dummy module adding section 305 adds the input dummy module to the program stored in step 1401 (step 1402). Dummy module adding section 305 provides a name of the added dummy module to dummy information storage section 304.

Then, in program structure conversion section 30, program dividing section 302 divides the program to which the dummy module is added in step 1402 into N modules including the dummy module (step 1403). Further, program dividing section 302 outputs the number of divided modules to division information storage section 306.

Program output section 307 outputs the modules divided in step 1403 to watermark inserting section 40.

Then, watermark inserting section 40 receives in program input section 401 the modules output from program structure conversion section 30.

In watermark inserting section 40, inserting section 402 refers to module information storage section 408, and obtains information on the dummy module. Inserting section 402 determines whether a module is the dummy module starting with a module with number i of 1 (step 1404) to a module of number N (step 1405) i.e. on all the modules (step 1406).

When determining that a module is not the dummy module in step 1406, inserting section 402 generates a watermark from a distributor ID generated in ID information generating section 404 to insert to the module (step 1407). Further, inserting section 402 outputs a name of the module to which the watermark is inserted to watermark information storage section 405.

Then, program creation apparatus 10 increments i (step 1408), and returns to step 1405.

When determining a module is the dummy module in step 1406, watermark inserting section 40 does not insert a watermark into the module, and outputs the dummy module to signature section 50 via program output section 406. Then, program creation apparatus 10 increments i (step 1408), and returns to step 1405.

When the aforementioned processing is finished on all the modules (step 1405), inserting section 402 outputs modules (main-body modules) with the watermark inserted therein to program output section 406, and program output section 406 provides the modules to signature section 50.

In signature section 50, program input section 501 receives the modules with the watermark inserted therein to output to signature adding section 502.

Signature adding section 502 calculates a hash value of the module (main-body module) with the watermark inserted therein, and adds the hash value as an digital signature (step 1409).

Signature adding section 502 receives a secret key from signature key input section 503, and encrypts the added hash value.

Then, signature adding section 502 outputs the module (main-body module) with the signature and watermark added thereto to transmission section 60 via program output section 506.

Finally, in transmission section 60, program input section 601 receives modules, and transmission data packaging section 602 generates a distributor package to output to encryption section 607.

Using an encryption key used in dealing the package between program creation apparatus 10 and program distribution apparatus 70, encryption section 607 encrypts the package (step 1410), and further encrypts the verification program input from verification program input section 608 (step 1411). Then, program transmission section 606 transmits distributor package 700 and verification program 708 to the distributor (step 1412).

Distributor package 700 contains N−1 main-body modules 701, a single dummy module 702, signature value 703 corresponding to N−1 main-body modules 701, public key 704 to decode encrypted signature values, dummy module name 705, secret key 706 for the distributor to sign on the dummy module, public key 707 corresponding to secret key 706, and install program 709.

In addition, when the public key is available separately via a transmission path, it is not necessary to always transmit a certificate.

The signature and each module are associated with one another using a format (signature format) such as XML signature. The XML signature is capable of representing a target for signature, signature algorithm, signature value, certificate and others in a unified manner in XML.

Thus, program creation apparatus 10 transmits the distributor package comprised of the dummy module to be used by the distributor freely and main-body modules to which the watermark and digital signature are inserted to the distributor.

In this way, the distributor is capable of inserting an ID for specifying a user or the like into the dummy module.

Further, since the main-body modules are given digital signature, the distributor cannot perform tampering on the main-body modules.

Furthermore, since distributor package 700 is encrypted using a secret key determined between program creation apparatus 10 and program distribution apparatus 70, it is also possible to prevent tampering on distributor package 700 by persons except the authorized distributor.

The operation carried out in program distribution apparatus 70 on the distributor side will be described below with reference to FIG. 15. FIG. 15 is a flowchart on the operation of program distribution apparatus 70 on the distribution side.

Program distribution apparatus 70 receives in reception section 90 the distributor package transmitted from program creation apparatus 10 of the creator, and decodes the package to store in storage section 110 (step 1501).

Program distribution apparatus 70 receives in request reception section 100 a request for download from a user, and judges whether the received request is a download request for the package (step 1502).

When the request is not the download request for the package, since the request is for the verification program, transmission section 140 encrypts the verification program in encryption section 1407, using an encryption key which is generated in encryption key generating section 1405 and used in dealing the package between program distribution apparatus 70 and program use apparatus 150, and transmits the program to program use apparatus 150 from program transmission section 1406 (step 1512).

Meanwhile, when the request is for the package in step 1502, program input section 1201 in watermark inserting section 120 receives the distributor package form storage section 110. Next, inserting section 1202 in watermark inserting section 120 depackages the distributor package and fetches N modules (step 1503).

Next, inserting section 1202 refers to module information storage section 1208 and fetches information on the dummy module. Then, using the fetched information on the dummy module, inserting section 1202 checks the fetched N modules on whether each of the modules is the dummy module while varying the module number i from 1 (step 1504) to N (step 1505) (step 1506).

When a module is the dummy module, inserting section 1202 fetches a user ID from ID information generating section 1204, and inserts a watermark using the user ID to the dummy module (step 1507). Then, inserting section 1202 outputs the module to which the watermark is inserted to program output section 1206, and program output section 1206 outputs the module to signature section 130.

Inserting section 1202 further outputs a name of the module with the watermark inserted therein to watermark information storage section 1205.

Signature section 130 receives the input module in program input section 1301. Signature section 130 calculates a hash value of the dummy module in signature adding section 1302. Next, signature adding section 1302 encrypts the calculated hash value using secret key (creator secret key) 706 which is to sign on the dummy module of distributor package 700, transmitted from program creation apparatus 10 and input from signature key input section 1303. Signature section 1302 adds the encrypted digital signature to the dummy module to output to program output section 1306 (step 1508). Program output section 1306 outputs the dummy module with the digital signature added thereto to transmission section 140.

Finally, program distribution apparatus 70 increments i (step 1509), and returns to step 1505.

Meanwhile, when a module is not the dummy module in step 1506, program distribution apparatus 70 does not perform insertion of the user ID and signature, outputs the module to transmission section 140, increments i, and returns to step 1505.

Program distribution apparatus 70 executes the aforementioned processing on all the modules.

Transmission section 140 receives in program input section 1401 modules transmitted from program output section 1306 to output to transmission data packaging section 1402.

Transmission data packaging section 1402 generates a user package to output to encryption section 1407.

Using an encryption key for communications generated in encryption key generating section 1405, encryption section 1407 encrypts the packaged user package 1000 (step 1510) to output to program transmission section 1406. Then, program transmission section 1406 transmits the encrypted package to program use apparatus 150 (step 1511).

Encryption section 1407 adds to user package 1000 N-1 main-body modules 701, a single dummy module 702, signature value (hash value) 703 of the N-1 main-body modules, signature value 1004 of the dummy module, public key 704 for signature value 703 of the main-body modules, public key 707 used for signature value 1004 of the dummy module, and install program 709.

In addition, when the public key is available separately via a transmission path, it is not necessary to always transmit a certificate of the key.

The dummy module and signature are associated with each other in the same way as in the distributor package using the signature format.

In this way, program distribution apparatus 70 is capable of inserting an ID for specifying a user or the like into the dummy module. It is thus possible to prevent unauthorized use of the program by a user.

Further, the dummy module is given the digital signature, and therefore, cannot be tampered. Furthermore, since the digital signature added to the dummy module is encrypted using a secret key of the creator, the user cannot specify the dummy module to which the ID of the user is inserted based on a difference in the public key used in decoding. As a result, it is possible to prevent with reliability the dummy module from being tampered by the user.

Moreover, since user package 1000 is encrypted using a secret key determined between program distribution apparatus 70 and program use apparatus 150, it is also possible to prevent tampering on user package 1000 by persons except the authorized user.

The operation carried out in user 110 will be described below with reference to FIG. 16. FIG. 16 is a flowchart on the operation of program use apparatus 150.

First, program use apparatus 150 transmits in request transmission section 160 a request for program transmission and a terminal ID of the apparatus 150 to a distributor (step 1601).

Program use apparatus 150 receives in reception section 170 the user package transmitted from program distribution apparatus 70, and decodes the package to store in storage section 180 (step 1602).

Received module check section 190 receives in program input section 1901 the package stored in storage section 180.

In received module check section 190, received package check section 1902 acquires a size or CRC size of the package from package information storage section 1903. Then, received package check section 1902 checks whether the size or CRC size of the package obtained from package information storage section 1903 agrees with the size of the received package, and thereby checks whether the input package becomes incomplete data due to a packet loss or the like (step 1603).

When the received package is incomplete data in step 1603, received package check section 1902 displays an error message to the user (step 1615), and discards the received package (step 1616).

Meanwhile, when complete data is received in step 1603, received package check section 1902 depackages the received package and extracts N modules (step 1604). Then, received package check section 1902 outputs N modules to signature check section 1904.

Signature check section 1904 fetches the N modules, and calculates an digital signature of each of the modules from number i of 1 (step 1605) to N (step 1606) (step 1607). Signature check section 1904 decodes the digital signature added to each module using public keys 704 and 707 added to user package 1000. Then, signature check section 1904 compares the digital signature added to each module with the calculated digital signature, and thereby checks whether each module is authorized one (step 1608).

When the signature is correct, signature check section 1904 provides the module to module combining section 1904. Check section 1904 increments i (step 1609), and returns to step 1606.

When the signature is not correct, signature check section 1904 displays an error message (step 1615), and discards the received package (step 1616).

When all the modules have passed the signature check, module combining section 1905 combines the modules to generate the program (step 1610). After generating the program, module combining section 1905 outputs the program to watermark check section 1907.

Watermark check section 1907 requests the watermark verification program to program distribution apparatus 70, and receives the verification program in verification program input section 1906 (step 1611).

Using the received verification program, watermark check section 1907 extracts the watermark of the generated program (step 1612), and checks whether the watermark aggress with the terminal ID input from terminal information input section 1908 (step 1613).

When the watermark agrees with the terminal ID, watermark check section 1907 once stores the program in storage section 200 via program output section 1909.

Then, execution section 210 uses install program 1002 on the program stored in storage section 200, and thereby installs the program to execute (step 1614).

Meanwhile, when the watermark does not agree with the ID, the check section 1907 does not store the program, displays an error message (step 1615), and discards the received package (step 1616).

Thus, by comparing the digital signature added to the module with the calculated digital signature, program use apparatus 150 is capable of judging the validity of the received program.

Further, by comparing the watermark inserted into the dummy module with the ID information of the apparatus 150, program use apparatus 150 is capable of judging the validity of the received program.

Furthermore, program use apparatus 150 acquires public key 704 of the signature value of the main-body module and public key 707 of the signature value of the dummy module from user package 1000, and is capable of decoding the signature values using these keys. Meanwhile, the encrypted signature value cannot be decoded without using the secret key of the authorized creator, and it is thus possible to recognize an illegal program.

A structure for specifying a leak destination in unauthorized leakage of a program will be described below with reference to FIG. 17.

Figure 17:
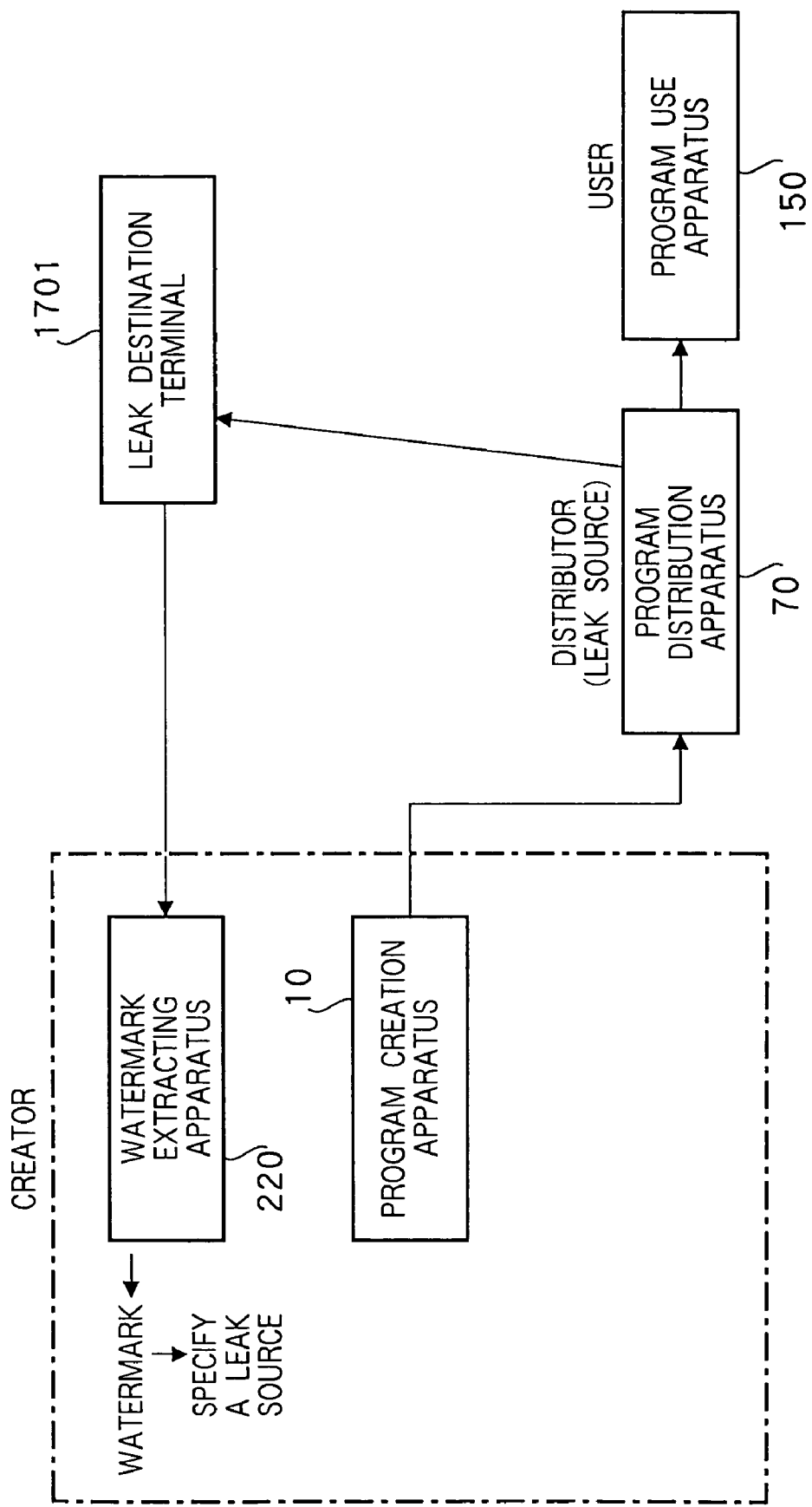
FIG. 17 is a diagram to explain a structure for specifying a leak destination in the case of unauthorized leakage of a program in Embodiment 1.

As shown in FIG. 17, when a program improperly leaks, the creator extracts the watermark from the program having leaked to leak destination terminal 1701 using watermark extracting apparatus 220, and is capable of specifying program distribution apparatus 70 of a distributor that is the leak source.

Figure 18:
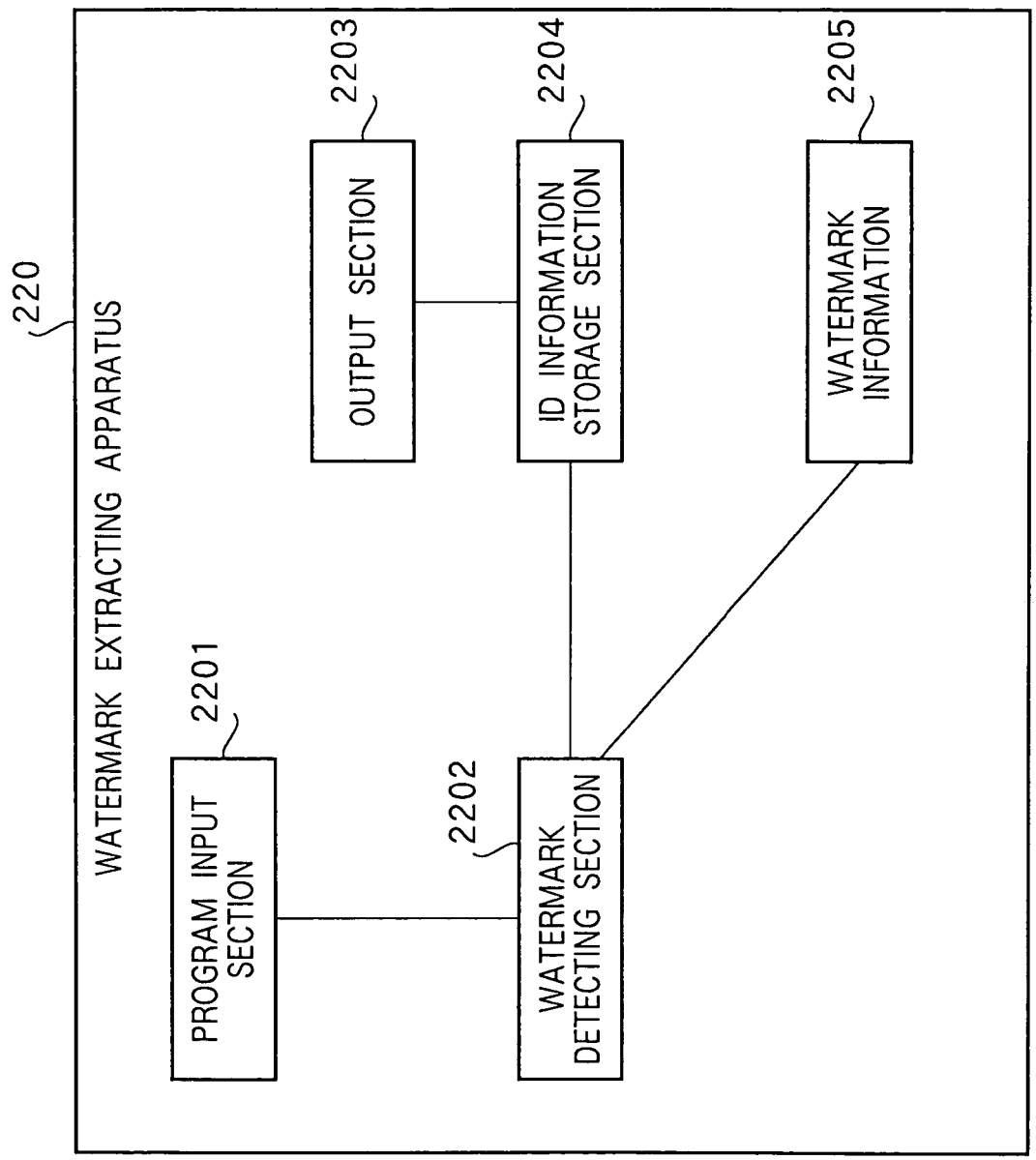
FIG. 18 is a configuration diagram of a watermark extracting apparatus in Embodiment 1.

Watermark extracting apparatus 220 according to Embodiment 1 will be described below with reference to FIG. 18. FIG. 18 is a configuration diagram of watermark extracting apparatus 220 in Embodiment 1.

Program input section 2201 receives a program with the watermark inserted therein, and outputs the program to watermark detecting section 2202.

ID information storage section 2204 generates information of a distribution destination from ID information obtained from watermark detecting section 2202.

When the ID information is an ID of data in a database, ID information storage section 2204 extracts data from the ID and thus acquires the information of the distribution destination. Further, when the ID information is encrypted data of the information of the distribution destination, ID information storage section 2204 decodes the data, and obtains the information of the distribution destination.

Watermark information storage section 2205 stores names of modules with the watermark inserted therein. These kinds of information are obtained from watermark information storage section 405 in watermark inserting section 40.

Watermark detecting section 2202 extracts the watermark inserted into the module from the module with the name obtained from watermark information storage section 2205. Then, watermark detecting section 2202 generates ID information from the extracted watermark to provide to output section 2203.

Output section 2203 refers to ID information storage section 2204, extracts information of the distribution destination from the ID information generated in watermark detecting section 2202, and outputs the information.

In this way, watermark extracting apparatus 220 outputs the information of the distribution source that has illegally distributed the program.

In addition, the present invention is applicable to the case where a watermark verification program is added to a program received in program use apparatus 150.

In this case, the operation of transmission section 60 and received module check section 190 differs from that of the above-mentioned case.

In transmission section 60, verification program input section 609 does not receive the watermark verification program. Further, in received module check section 190, the operation is not carried out in verification program input section 1901, terminal information input section 1908 and watermark check section 1907.

A program created in Embodiment 1 will be described below with reference to FIG. 21.

Figure 21:
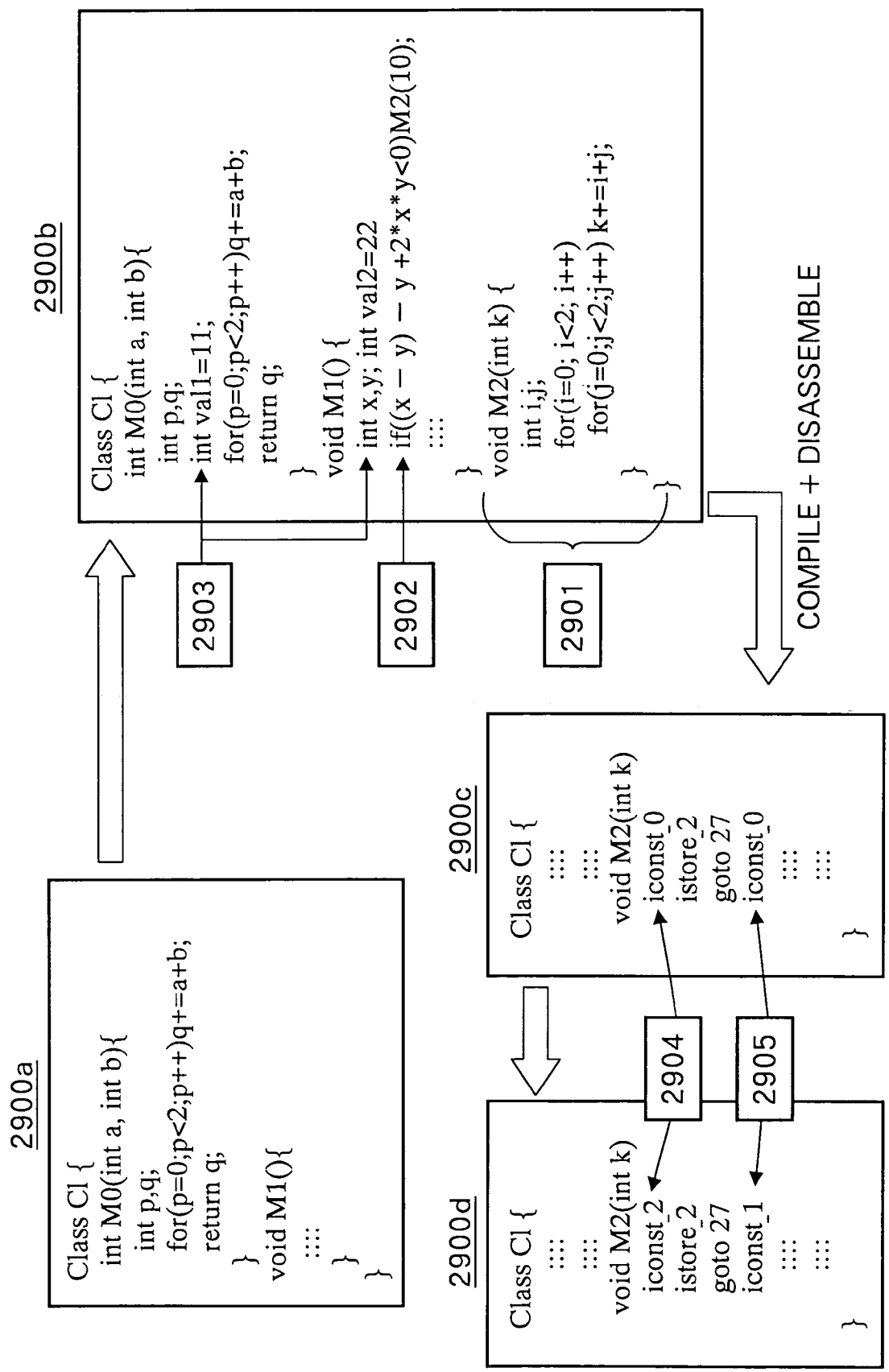
FIG. 21 is a diagram to explain a program created in Embodiment 1.

In FIG. 21, program 2900a is a basic program stored in storage section 20. Program 2900b is a program obtained by adding distributor watermark information and dummy method to basic program 2900a. Program 2900c is a program obtained by compiling basic program 2900a, and program 2900d indicates a program obtained by inserting user watermark information into program 2900c.

First, in program creation apparatus 10, dummy module adding section 305 in program structure conversion section 30 adds a dummy method to program 2900a in step 1402 (portion shown by 2901 in the figure). Further, a call statement of the dummy method is added to program 2900a using the assert method, for example (portion shown by 2902 in the figure).

Inserting section 402 in watermark inserting section 40 judges whether each method is a dummy method in step 1406, and when the method is not a dummy method, inserts watermark information S1 (11) and S2 (22) (portion shown by 2903) generated from the ID information of the distributor (1122). After inserting the watermark information of the distributor, in step 1409, the program is compiled, and the digital signature is added to portions except the dummy method. In addition, for sake of simplicity, descriptions are given using a disassembled program.

In program distribution apparatus 70, inserting section 1202 of watermark inserting section 120 judges whether each method is a dummy method in step 1506. When a method is the dummy method, the section 1202 inserts watermark information U1 (100111 001101 101000 001011) (portion shown by 2904 in the figure) generated from ID information ((C) 11) of the user, and the digital signature is added to the dummy method in step 1508.

Next, in program use apparatus 150, signature check section 1904 in received module check section 190 verifies the digital signature added to program 2900d in step 1607, using the install program distributed from program creation apparatus 10. Further, watermark check section 1907 in received module check section 190 extracts the watermark from dummy method MS using the verification program distributed from program creation apparatus 10 in step 1612, and compares the watermark with a terminal ID in step 1613. When program 2900d passes verification in steps 1607 and 1613, program use apparatus 150 installs the program 2900d to execute.

In addition, this Embodiment describes the case of adding a method as a dummy module, but is applicable to the case of adding a class.

As described above, according to Embodiment 1, by adding a dummy module separately from main-body modules, a distributor is capable of inserting a user ID to the dummy module. Further, by adding signatures to main-body modules, it is possible to prevent a distributor from operating a main-body module that is a fundamental important portion of the program. It is thereby possible to prevent tampering of the program by the distributor.

Further, according to Embodiment 1, the digital signature added to a main-body module is encrypted using a secret key for the main-body module of the creator, and a distributor does not have the secret key for the main-body module of the creator. By this means, even if a distributor decodes the digital signature using public key 704 to tamper with, it is not possible to encrypt again using the secret key of the creator. Accordingly, a user cannot decode the main-body modules. As a result, it is possible to assuredly prevent a distributor from tampering with a main-body module.

Furthermore, according to Embodiment 1, even if the program illegally leaks, since a distributor ID is inserted into a main-body module, it is possible to specify a distributor that is a leak source. It is thus possible to prevent tampering of the program by a distributor.

Still furthermore, according to Embodiment 1, since a program portion is divided into a plurality of main-body modules, there increases the number of all the modules including the dummy module, and a user needs to specify the dummy module to which the ID of the user is inserted among a large number of modules, resulting in difficulty. Further, the difference in size decreases between the module and dummy module, and it is thus impossible for a user to specify the dummy module to which the ID of the user is inserted. Accordingly, it is possible to prevent tampering of the program by the user.

Moreover, according to Embodiment 1, by providing distributor package 700 with a secret key for a signature on a dummy module, it is possible for a distributor to add an digital signature to a dummy module using a secret key of the creator. When a distributor adds an digital signature to a dummy module using a secret key of the distributor, issue sources of certificates are different between a secret key for a main-body module and secret key for a dummy module. Therefore, a user is capable of specifying a portion of the dummy module readily and specifying a watermark inserted portion with ease. However, in Embodiment 1, since certificates used by a user in verification of signatures are all issued to the creator, it is impossible to specify a watermark inserted portion using an issue source of a certificate, and it is thus possible to prevent deletion of a watermark by a user.

In addition, it may be possible to prepare a program for the operation of each of program creation apparatus 10, program distribution apparatus 70 and program use apparatus 150, store the program in a storage medium, and make a general computer download the program from the storage medium to execute.

Embodiment 2

Figure 19:
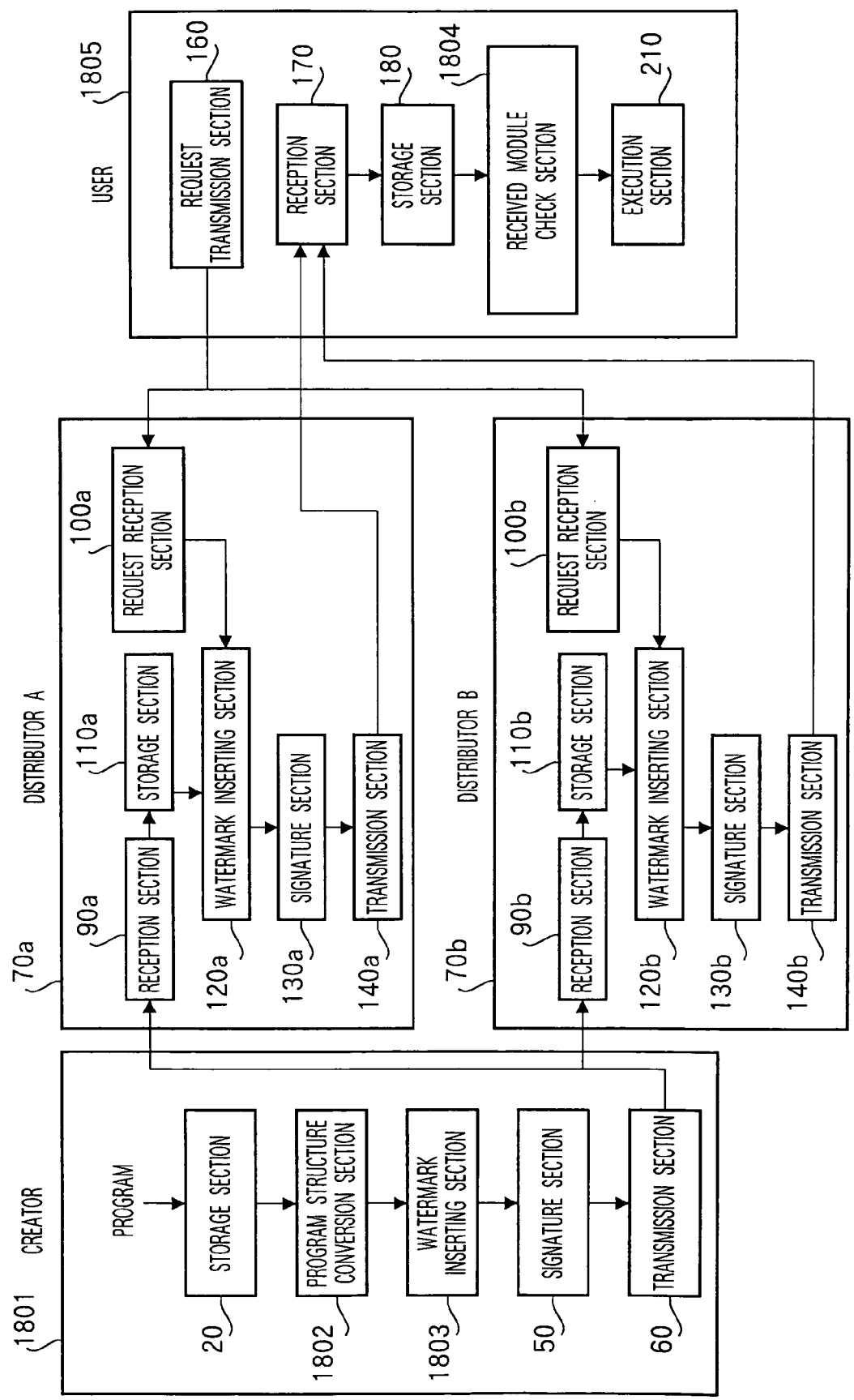
FIG. 19 is a configuration diagram of a program distribution system according to Embodiment 2 of the present invention.

A program distribution system according to Embodiment 2 of the present invention will be described below with reference to accompanying drawings. Embodiment 2 of the present invention corresponds to the case that a user downloads different modules of a program from a plurality of distributors. FIG. 19 is a configuration diagram of a program distribution system in Embodiment 2.

The program distribution system in Embodiment 2 differs from that in Embodiment 1 in the respects that a creator divides a program to transmit to a plurality of distributors, and that a user receives the divided program via the plurality of distributors.

More specifically, program creation apparatus 1801 on the creator side is different from program creation apparatus 10 in Embodiment 1 in the operation of program structure conversion section 1802 and watermark inserting section 1802. Further, program use apparatus 1805 on the user side is different from program use apparatus 150 in Embodiment 1 in the operation of received module check section 1804.

Program structure conversion 1802 in Embodiment 2 will be described below. Program structure conversion section 1802 in Embodiment 2 is different from program structure conversion section 30 in Embodiment 1 in the operation of dummy module adding section 305.

Dummy module adding section 305 in Embodiment 2 adds to the program two dummy modules input from dummy module input section 303. Dummy module adding section 305 adds the dummy modules to be called by different main-body modules using the assert method.

In addition, program structure conversion section 1802 is the same as program structure conversion section 30 in Embodiment 1 except the operation of dummy module adding section 305, and descriptions thereof are omitted.

Watermark inserting section 1803 according to Embodiment 2 will be described below. Watermark inserting section 1803 in Embodiment 2 is different from watermark inserting section 40 in Embodiment 1 in the operation of inserting section 402.

Inserting section 402 in Embodiment 2 generates a watermark to actually insert into the program from ID information generated in ID information generating section 404, and with respect to modules with names except a dummy module name input from module information storage section 408, inserts a distributor ID for specifying a distributor A into a portion, while further inserting a distributor ID for specifying a distributor B into another portion.

In addition, the other portions of watermark inserting section 1803 in Embodiment 2 are the same as those of watermark inserting section 40 in Embodiment 1, and descriptions thereof are omitted.

Received module check section 1804 will be described below.

Received module check section 1804 checks packages received from the distributor A and distributor B, depackages respective packages of the distributors A and B, and fetches total N programs.

The operation will be described below where a program generated in program creation apparatus 1802 of the creator is transmitted to program distribution apparatus 70a of the distributor A and program distribution apparatus 70b of the distributor B, and downloaded into program use apparatus 150 of a user.

Figure 20:
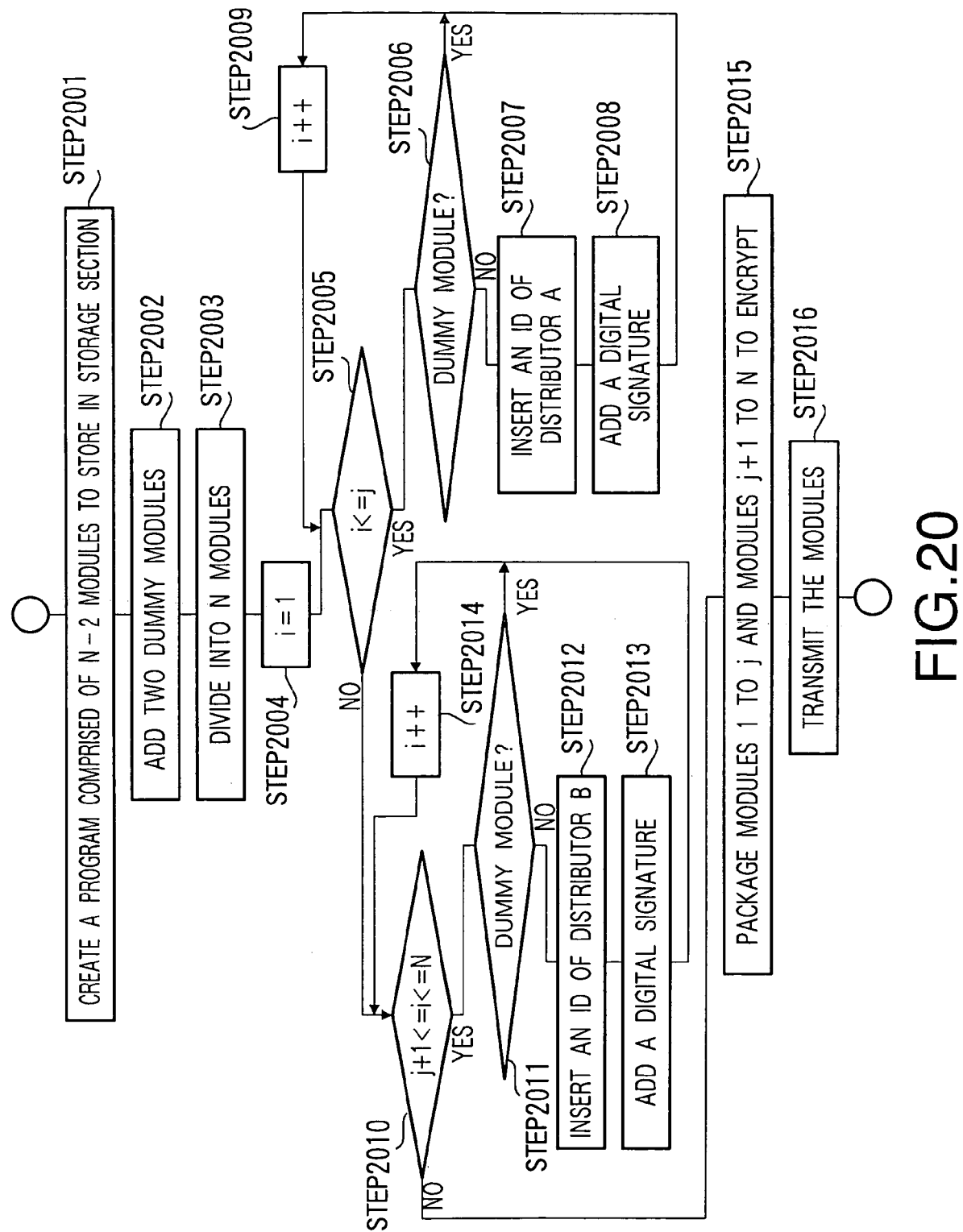
FIG. 20 is a flowchart showing the operation carried out in a program creation apparatus in Embodiment 2.

The processing in program creation apparatus 1801 will be described below with reference to FIG. 20. FIG. 20 is a flowchart illustrating the operation carried out in program creation apparatus 1801 in Embodiment 2.

First, program creation apparatus 1801 creates a program comprised of N−2 modules to store in storage section 20 (step 2001). Then, program structure conversion section 1802 adds two dummy modules to insert a user ID to the program (step 2002), and divides the program into N modules including the dummy modules (step 2003).

In addition, FIG. 19 shows the case of two distributors. However, the present invention is applicable to cases of three or more distributors, and in this case, dummy modules are added corresponding to the number of distributors.

Watermark inserting section 1803 varies the module number i from 1 (step 2004) to j (step 2005) to check whether a module with each number is the dummy module (step 2006).

When the module is not the dummy module, watermark inserting section 1803 inserts a distributor ID for specifying a distributor A (step 2007). Next, signature section 50 adds an digital signature to the dummy module with the distributor ID inserted therein (step 2008). Then, program creation apparatus 1801 increments i (step 2009), and returns to step 2005.

When it is judged that the module is the dummy module in step 2006, program creation apparatus 1801 does not perform insertion of watermark and digital signature, increments i, and returns to step 2005.

Next, watermark inserting section 1803 varies i from j+1 to N (step 2010) to check whether each module is the dummy module (step 2011).

Then, when the module is not the dummy module, watermark inserting section 1803 inserts an ID for specifying a distributor B (step 2012), and signature section 50 adds an digital signature (step 2013). Then, program creation apparatus 1801 increments i (step 2014) and returns to step 2010.

When it is judged that the module is the dummy module in step 2011, program creation apparatus 1801 does not perform insertion of watermark and digital signature, increments i, and returns to step 2010.

Finally, transmission section 60 packages modules to transmit to the distributor A and distributor B to encrypt (step 2015), and transmits packages to program distribution apparatus 70a of the distributor A and program distribution apparatus 70b of the distributor B, respectively (step 2016).

The operation of program distribution apparatus 70a and program distribution apparatus 70b in Embodiment 2 will be described below. The operation of program distribution apparatus 70a and program distribution apparatus 70b in Embodiment 2 differ from the operation of program distribution apparatus 70 in Embodiment 1 in the operation of steps 1503 and 1505.

In step 1503 in Embodiment 1, in Embodiment 2 program distribution apparatus 70a of the distributor A fetches j modules, while program distribution apparatus 70b of the distributor B fetches N−j modules.

Further, in step 1505 in Embodiment 1, in Embodiment 2 program distribution apparatus 70a of the distributor A varies i from 1 to j, while program distribution apparatus 70b of the distributor B varies i from j+1 to N.

In addition, each step except steps 1503 and 1505 provides the same operation in Embodiment 2 as that in Embodiment 1, and descriptions thereof are omitted.

Next, the operation of program use apparatus 1805 of a user in Embodiment 2 will be described below. The operation of program use apparatus 1805 in Embodiment 2 is different from the operation of program use apparatus 150 in Embodiment 1 in the operation of steps 1601 to 1604 in Embodiment 1.

In step 1601 in Embodiment 1, in Embodiment 2 a terminal ID is transmitted to program distribution apparatus 70a of the distributor A and program distribution apparatus 70b of the distributor B.

In step 1602 in Embodiment 1, in Embodiment 2 respective packages are received from program distribution apparatus 70a of the distributor A and program distribution apparatus 70b of the distributor B, decoded and stored.

In step 1603 in Embodiment 1, in Embodiment 2 respective packages, which are received from program distribution apparatus 70a of the distributor A and program distribution apparatus 70b of the distributor B, are checked.

Then, in step 1604 in Embodiment 1, in Embodiment 2 the respective packages of program distribution apparatus 70a of the distributor A and program distribution apparatus 70b of the distributor B are depackaged, and total N programs are fetched.

Each step subsequent to step 1604 in Embodiment 1 provides the same operation in Embodiment 2 as that in Embodiment 1, and descriptions thereof are omitted.

As described above, according to Embodiment 2, different part of program is transmitted to the distributor A and distributor B, so that the distributor A and distributor B cannot have the complete program. It is thereby possible to prevent unauthorized leakage due to the distributor A and/or distributor B pretending to be a user.

As described above, according to the present invention, it is possible to insert a user ID without causing a distributor to operate main-body modules of a program, and it is thus possible to prevent tampering of the program by the distributor. Further, inserting a distributor ID as watermark information enables suppression of unauthorized leakage. The present invention is applicable to distribution of content such as moving pictures and audio, as well as programs, and thus is widely applied.

The present invention is not limited to the above described embodiments, and various variations and modifications may be possible without departing from the scope of the present invention.

This application is based on the Japanese Patent Application No.2003-305397 filed on Aug. 28, 2003, and the Japanese Patent Application No.2004-199677 filed on Jul. 6, 2004 entire content of which is expressly incorporated by reference herein.

FIG. 1
CREATOR
10 PROGRAM CREATION APPARATUS
20 STORAGE SECTION
30 PROGRAM STRUCTURE CONVERSION SECTION
40 WATERMARK INSERTING SECTION
50 SIGNATURE SECTION
60 TRANSMISSION SECTION
DISTRIBUTOR
70 PROGRAM DISTRIBUTION APPARATUS
90 RECEPTION SECTION
100 REQUEST RECEPTION SECTION
110 STORAGE SECTION
120 WATERMARK INSERTING SECTION
130 SIGNATURE SECTION
140 TRANSMISSION SECTION
USER A
150a PROGRAM USE APPARATUS
160 REQUEST TRANSMISSION SECTION
170 RECEPTION SECTION
180 STORAGE SECTION
190 RECEIVED MODULE CHECK SECTION
200 STORAGE SECTION
210 EXECUTION SECTION
USER B
150b PROGRAM USE APPARATUS
FIG. 2
30 PROGRAM STRUCTURE CONVERSION SECTION
301 PROGRAM INPUT SECTION
302 PROGRAM DIVIDING SECTION
303 DUMMY MODULE INPUT SECTION
304 DUMMY INFORMATION STORAGE SECTION
305 DUMMY MODULE ADDING SECTION
306 DIVISION INFORMATION STORAGE SECTION
307 PROGRAM OUTPUT SECTION
FIG. 3
40 WATERMARK INSERTING SECTION
401 PROGRAM INPUT SECTION
402 INSERTING SECTION
403 WATERMARK DATA INPUT SECTION
404 ID INFORMATION GENERATING SECTION
405 WATERMARK INFORMATION STORAGE SECTION
406 PROGRAM OUTPUT SECTION
408 MODULE INFORMATION STORAGE SECTION
FIG. 4
50 SIGNATURE SECTION
501 PROGRAM INPUT SECTION
502 SIGNATURE ADDING SECTION
503 SIGNATURE KEY INPUT SECTION
505 SIGNATURE DATA STORAGE SECTION
506 PROGRAM OUTPUT SECTION
508 MODULE STORAGE SECTION
FIG. 5
60 TRANSMISSION SECTION
601 PROGRAM INPUT SECTION
602 TRANSMISSION DATA PACKAGING SECTION
605 ENCRYPTION KEY GENERATING SECTION

606 PROGRAM TRANSMISSION SECTION
607 ENCRYPTION SECTION
608 PACKAGE DATA INPUT SECTION
609 VERIFICATION PROGRAM INPUT SECTION
610 PACKAGE INFORMATION STORAGE SECTION
611 INSTALL PROGRAM INPUT SECTION
FIG. 6 FIG. 10
CREATOR
700 DISTRIBUTOR PACKAGE
701 MAIN-BODY MODULES
702 DUMMY MODULE
703 SIGNATURE VALUE
704 PUBLIC KEY
705 DUMMY MODULE NAME
706 SECRET KEY TO SIGN ON DUMMY MODULE
707 PUBLIC KEY FOR SIGNATURE VALUE OF DUMMY MODULE
708 VERIFICATION PROGRAM
709 INSTALL PROGRAM
FIG. 7
120 WATERMARK INSERTING SECTION
1201 PROGRAM INPUT SECTION
1202 INSERTING SECTION
1203 WATERMARK DATA INPUT SECTION
1204 ID INFORMATION GENERATING SECTION
1205 WATERMARK INFORMATION STORAGE SECTION
1206 PROGRAM OUTPUT SECTION
1208 MODULE INFORMATION STORAGE SECTION
FIG. 8
130 SIGNATURE SECTION
1301 PROGRAM INPUT SECTION
1302 SIGNATURE ADDING SECTION
1303 SIGNATURE KEY INPUT SECTION
1305 SIGNATURE DATA STORAGE SECTION
1306 PROGRAM OUTPUT SECTION
1308 MODULE INFORMATION STORAGE SECTION
FIG. 9
140 TRANSMISSION SECTION
1401 PROGRAM INPUT SECTION
1402 TRANSMISSION DATA PACKAGING SECTION
1405 ENCRYPTION KEY GENERATING SECTION
1406 PROGRAM TRANSMISSION SECTION
1407 ENCRYPTION SECTTION
1408 PACKAGE DATA INPUT SECTION
1410 PACKAGE INFORMATION STORAGE SECTION
1412 VERIFICATION PROGRAM INPUT SECTION
FIG. 10
DISTRIBUTOR
1000 USER PACKAGE
1004 SIGNATURE VALUE OF DUMMY MODULE
FIG. 11 FIG. 13
190 230 RECEIVED MODULE CHECK SECTION
1901 PROGRAM INPUT SECTION
1902 RECEIVED PACKAGE CHECK SECTION
1903 PACKAGE INFORMATION STORAGE SECTION
1904 SIGNATURE CHECK SECTION
1905 MODULE COMBINING SECTION
1906 VERIFICATION PROGRAM INPUT SECTION
1907 WATERMARK CHECK SECTION
1908 TERMINAL INFORMATION INPUT SECTION
1909 PROGRAM OUTPUT SECTION
FIG. 12
2001 PROGRAM GENERATED IN RECEIVED MODULE CHECK SECTION
2002 WATERMARK VERIFICATION PROGRAM
2003 PROGRAM

FIG. 14
STEP 1401 CREATE A PROGRAM COMPRISED OF N−1 MODULES TO STORE
STEP 1402 ADD ONE DUMMY MODULE
STEP 1403 DIVIDE INTO N MODULES
STEP 1406 DUMMY MODULE ?
STEP 1407 INSERT A DISTRIBUTOR ID
STEP 1409 COMPILE AND ADD AN DIGITAL SIGNATURE
STEP 1410 GENERATE AND ENCRYPT A DISTRIBUTOR PACKAGE
STEP 1411 ENCRYPT A VERIFICATION PROGRAM
STEP 1412 TRANSMIT THE PACKAGE AND VERIFICATION PROGRAM
FIG. 15
STEP 1501 RECEIVE A DISTRIBUTOR PACKAGE AND DECODE TO STORE
STEP 1502 PACKAGE REQUEST ?
STEP 1503 DEPACKAGE AND FETCH N MODULES
STEP 1506 DUMMY MODULE ?
STEP 1507 INSERT A USER ID
STEP 1508 ADD AN DIGITAL SIGNATURE
STEP 1510 GENERATE AND ENCRYPT A USER PACKAGE
STEP 1511 TRANSMIT MODULES TO A USER
STEP 1512 ENCRYPT A VERITIFCATION PROGRAM TO TRANSMIT
FIG. 16
STEP 1601 TRANSMIT A TERMINAL ID TO A DISTRIBUTOR TO REQUEST A PROGRAM,
STEP 1602 RECEIVE A USER PACKAGE AND DECODE TO STORE
STEP 1603 PACKAGE IS COMPLETE ?
STEP 1604 DEPACKAGE AND FETCH N MODULES
STEP 1607 CONFIRM A SIGNATURE
STEP 1608 THE SIGNATURE IS CORRECT ?
STEP 1610 GENERATE A PROGRAM
STEP 1611 REQUEST VERIFICATION PROGRAM AND RECEIVE
STEP 1612 EXTRACT AN ELECTRONIC WATERMARK
STEP 1613 THE WATERMARK IS IN AGREEMENT WITH THE TERMINAL ID ?
STEP 1614 STORE THE PROGRAM AND EXECUTE
STEP 1615 DISPLAY "ERROR"
STEP 1616 DISCARD RECEIVED DATA
FIG. 17
CREATOR
10 PROGRAM CREATION APPARATUS
70 PROGRAM DISTRIBUTION APPARATUS
DISTRIBUTOR (LEAK SOURCE)
150 PROGRAM USE APPARATUS USER
220 WATERMARK EXTRACTING APPARATUS WATERMARK SPECIFY A LEAK SOURCE
1701 LEAK DESTINATION TERMINAL
FIG. 18
220 WATERMARK EXTRACTING APPARATUS
2201 PROGRAM INPUT SECTION
2202 WATERMARK DETECTING SECTION
2203 OUTPUT SECTION
2204 ID INFORMATION STORAGE SECTION
2205 WATERMARK INFORMATION STORAGE SECTION
FIG. 19
CREATOR
DISTRIBUTOR A
DISTRIBUTOR B
USER 90a 90b RECEPTION SECTION
100a 100b REQUEST RECEPTION SECTION
110a 110b STORAGE SECTION
120a 120b WATERMARK INSERTING SECTION
130a 130b SIGNATURE SECTION
140a 140b TRANSMISSION SECTION
1802 PROGRAM STRUCTURE CONVERSION SECTION
1803 WATERMARK INSERTING SECTION
1804 RECEIVED MODULE CHECK SECTION
FIG. 20
STEP 2001 CREATE A PROGRAM COMPRISED OF N−2 MODULES TO STORE IN STORAGE SECTION
STEP 2002 ADD TWO DUMMY MODULES
STEP 2003 DIVIDE INTO N MODULES
STEP 2006 DUMMY MODULE ?
STEP 2007 INSERT AN ID OF DISTRIBUTOR A
STEP 2008 ADD AN DIGITAL SIGNATURE
STEP 2011 DUMMY MODULE ?
STEP 2012 INSERT AN ID OF DISTRIBUTOR B
STEP 2013 ADD AN DIGITAL SIGNATURE
STEP 2015 PACKAGE MODULES 1 TO j AND MODULES j+1 TO N TO ENCRYPT
STEP 2016 TRANSMIT THE MODULES
FIG. 21
COMPILE+DISASSEMBLE

What is claimed is:

1. A program distribution method for distributing a program that includes a main-body module, said distribution being from the creator of the program to a user via a distributor, the method comprising:
    inserting, at a device of the creator of the program, a distributor watermark into the main-body module of the program, wherein the distributor watermark specifies the distributor of the program,
    adding, at the device of the creator of the program, a dummy module to the program, the dummy module having no effect on the operation of the program;
    adding, at the device of the creator of the program, a main-body digital signature to the main-body module of the program, wherein the main-body digital signature prevents unauthorized tampering with the main-body module; and
    distributing the program, including the digitally-signed main-body module and the dummy module, to the distributor;
    inserting, at a device of the distributor, a user watermark into the dummy module of the program, wherein the user watermark specifies the user;
    adding, at a device of the distributor, a dummy module digital signature to the dummy module after the user watermark is inserted, wherein the dummy module digital signature is added to the dummy module using a secret key transmitted from the creator of the program;
    transmitting the program, including the dummy module digital signature and the user watermark, to the user;
    receiving, at a device of the user, the program transmitted from the device of the distributor; and
    checking, at the device of the user, the user watermark in the program.

2. A program distribution system for distributing a program that includes a main-body module, the program distribution system comprising:
    a program creation apparatus including:
        a distributor watermark inserter that inserts a distributor watermark into the main-body module of the program, wherein the distributor watermark specifies the distributor of the program;
        a dummy module adder that adds a dummy module to the program, the dummy module having no effect on the operation of the program;
        a main-body digital signature adder that adds a main-body digital signature to the main-body module of the program, wherein the main-body digital signature prevents unauthorized tampering with the main-body module; and
        a distributor transmitter that distributes the program, including the digitally-signed main-body module and the dummy module, to a program distribution apparatus;
    the program distribution apparatus including:
        a user watermark inserter that inserts a user watermark into the dummy module of the program, wherein the user watermark specifies the user;
        a dummy module digital signature adder that adds a dummy module digital signature to the dummy module after the user watermark is inserted, wherein the dummy module digital signature is added to the dummy module using a secret key transmitted from the creator of the program; and
        a user transmitter that transmits the program, including the dummy module digital signature and the user watermark, to a program user apparatus;
    the program user apparatus including:
        a receiver that receives the program transmitted from the program distribution apparatus; and
        a user watermark checker that checks the user watermark in the program.

* * * * *